US008811668B2

(12) United States Patent
Dierks et al.

(10) Patent No.: US 8,811,668 B2
(45) Date of Patent: Aug. 19, 2014

(54) METHOD FOR CONTROLLING A HEADLAMP SYSTEM FOR A VEHICLE, AND HEADLAMP SYSTEM

(75) Inventors: Karsten Dierks, Kloetze (DE); Martin Freese, Wendeburg (DE); Bernd Jahrsau, Sassenburg (DE)

(73) Assignee: Volkswagen AG, Wolfsburg (DE)

( * ) Notice: Subject to any disclaimer, the term of this patent is extended or adjusted under 35 U.S.C. 154(b) by 216 days.

(21) Appl. No.: 13/511,121

(22) PCT Filed: Oct. 18, 2010

(86) PCT No.: PCT/EP2010/006345
§ 371 (c)(1),
(2), (4) Date: Aug. 6, 2012

(87) PCT Pub. No.: WO2011/060861
PCT Pub. Date: May 26, 2011

(65) Prior Publication Data
US 2013/0177202 A1    Jul. 11, 2013

(30) Foreign Application Priority Data

Nov. 21, 2009  (DE) .................. 10 2009 054 227

(51) Int. Cl.
| G06K 9/00 | (2006.01) |
| G06K 9/32 | (2006.01) |
| B60Q 1/08 | (2006.01) |
| B60Q 1/14 | (2006.01) |
| B60Q 1/00 | (2006.01) |

(52) U.S. Cl.
CPC ............ *B60Q 1/08* (2013.01); *B60Q 2300/056* (2013.01); *B60Q 2300/114* (2013.01); *B60Q 2300/20* (2013.01); *B60Q 2300/335* (2013.01); *G06K 9/3241* (2013.01); *B60Q 2300/112* (2013.01); *B60Q 2300/41* (2013.01); *G06K 9/00624* (2013.01); *B60Q 1/143* (2013.01); *B60Q 2300/338* (2013.01); *B60Q 2300/42* (2013.01); *B60Q 2300/122* (2013.01); *B60Q 2300/322* (2013.01); *G06K 2209/23* (2013.01); *G06K 9/00825* (2013.01)
USPC ............................ 382/103; 382/274; 362/465

(58) Field of Classification Search
CPC ............... G06K 9/00; B60Q 1/00; F21S 48/01
USPC ......... 382/100, 103, 106–107, 122, 162, 168, 382/173, 181, 190, 193, 199, 232, 254, 274, 382/276, 286–291, 305, 312; 362/539, 331, 362/466, 465; 250/208.1
See application file for complete search history.

(56) References Cited

U.S. PATENT DOCUMENTS 6,960,005 B2 * 11/2005 Daicho et al. ................. 362/466
7,565,006 B2    7/2009 Stam et al.

(Continued)

FOREIGN PATENT DOCUMENTS

| CN | 101023407 | 8/2007 |
| DE | 10 2006 043 281 | 3/2008 |

(Continued)

OTHER PUBLICATIONS

International Search Report, issued in corresponding International Application No. PCT/EP2010/006344.

(Continued)

*Primary Examiner* — Seyed Azarian
(74) *Attorney, Agent, or Firm* — Kenyon & Kenyon LLP

(57) ABSTRACT

In a method for controlling a headlamp system for a vehicle, the headlamp system having two headlamps, set apart from each other, road users are detected in front of the vehicle in the driving direction, and a first total light pattern is able to be produced, in which the illumination range on a first side of a center axis is greater than on the other, second side of this center axis, and a second total light pattern is able to be produced, in which the total light pattern is controllable such that it has an illumination range in the direction of at least one detected road user that is less than the distance to the detected road user, and which has an illumination range in another direction that is greater than the distance to the detected road user. During the switch from the first total light pattern to the second total light pattern, the illumination range of at least one headlamp on the first side of the center axis is first reduced to at least such an extent that it is less than the distance to the detected road user, the second total light pattern being produced subsequently.

8 Claims, 16 Drawing Sheets

(56) References Cited

U.S. PATENT DOCUMENTS

| | | | |
|---|---|---|---|
| 7,839,303 B2 | 11/2010 | Kumon et al. | |
| 8,017,898 B2 * | 9/2011 | Lu et al. | 250/208.1 |
| 8,070,329 B1 * | 12/2011 | Bechtel et al. | 362/331 |
| 8,465,187 B2 * | 6/2013 | Buchberger et al. | 362/539 |
| 8,480,270 B2 * | 7/2013 | Mochizuki | 362/465 |
| 2004/0143380 A1 | 7/2004 | Stam et al. | |
| 2011/0267455 A1 | 11/2011 | Goetz et al. | |

FOREIGN PATENT DOCUMENTS

| | | |
|---|---|---|
| DE | 10 2007 045 150 | 4/2008 |
| DE | 10 2007 048 508 | 4/2008 |
| DE | 10 2007 028 658 | 12/2008 |
| DE | 10 2007 038 077 | 2/2009 |
| DE | 10 2007 040 042 | 2/2009 |
| EP | 1 780 462 | 5/2007 |
| EP | 2 119 592 | 11/2009 |
| FR | 2 923 428 | 5/2009 |
| JP | 2006-327334 | 12/2006 |
| WO | 01/70538 | 9/2001 |
| WO | 2008/037388 | 4/2008 |
| WO | 2009/039882 | 4/2009 |

OTHER PUBLICATIONS

German Search Report, issued in corresponding German Patent Application No. 10 2009 054 227.2.

Chinese Office Action, dated Apr. 14, 2014, issued in corresponding Chinese Patent Application No. 201080061841.3.

* cited by examiner

METHOD FOR CONTROLLING A HEADLAMP SYSTEM FOR A VEHICLE, AND HEADLAMP SYSTEM

FIELD OF THE INVENTION

The present invention relates to a method for controlling a headlamp system for a vehicle; it also relates to a headlamp system for a vehicle equipped with a control device.

BACKGROUND INFORMATION

When the visual conditions are poor, especially in the dark, it is the task of the headlamps of a vehicle to illuminate the environment in front of the vehicle in the driving direction, in particular the roadway. In addition, the headlamps serve to identify the vehicle to other road users.

For the light emission in the driving direction, it is conventional to provide headlamps which are able to offer a low beam functionality and a high beam functionality. The high beam functionality produces a very comprehensive illumination of the environment. However, it has the disadvantage of blinding other road users, in particular the drivers of vehicles driving ahead and of vehicles approaching from the opposite direction. The low beam, on the other hand, makes it possible to generate a light pattern that does not blind other road users, but the illumination of the environment is much lower than in the high beam functionality. Due to the very high traffic densities that have developed in the meantime, the high beam functionality can be used only rarely nowadays. As a consequence, headlamp systems are needed which offer better illumination than the conventional low beam functionality, but which do not blind other road users in the manner in which the high beam functionality does.

One method for controlling a headlamp system for a vehicle is described in German Published Patent Application No. 10 2007 045 150. In this case the headlamp system includes two headlamps, which are situated at a distance from each other and emit a combined light beam in order to generate a total light pattern. In addition, the headlamps are equipped with a diaphragm array, whose position is variable in order to modify the total light pattern. In the method, a road user is detected in the direction of the light emission of the headlamp system. If such a road user has been detected, the position of at least one diaphragm array is modified such that a center region having a lower illumination range, as well as side regions, which are adjacent to this center region and have a greater illumination range, are formed in the total light pattern on both sides in the direction of the detected road user. The illumination range in the center region, in particular in the direction of the detected road user, is controlled as a function of the vertical angle, that is to say, the distance of the road user. The light pattern is generated exclusively by modifying the position of the diaphragms of the diaphragm array, and possibly by pivoting the light emission direction of the headlamps about a vertical axis.

German Published Patent Application No. 10 2007 028 658 describes another method for controlling a headlamp system of a vehicle. In this case the headlamp system has a right and a left headlamp unit, both being equipped with separate headlamps for a low beam and a high beam light. In the method, a road user is detected in the direction of the light emission of the headlamp system. Once such a road user has been detected, the light pattern generated by the headlamps for the high beam is modified with regard to the lateral illumination, whereas the light pattern for the low beam produced by the separate headlamps remains unchanged.

Finally, a system for generating a light bundle in the movement region in front of the vehicle is described in German Published Patent Application No. 10 2007 040 042. The system is made up of a headlamp having an LED field provided with a plurality of light diodes, which are electrically controllable individually. In addition, the system has an object detection device for detecting objects in the vicinity of the motor vehicle, and a position determination device for determining the position of a detected object in relation to the motor vehicle. In this system the individual light diodes are controlled such that a limit value for a luminous intensity in the region of a detected object is not exceeded.

SUMMARY

Example embodiments of the present invention provide a method and a headlamp system with whose aid a total light pattern may be generated which illuminates the environment of the vehicle as best as possible but does not blind other road users.

According to example embodiments of the present invention, a method for controlling a headlamp system of a vehicle is provided, in which the headlamp system has two headlamps situated at a distance from each other, and in which road users are detected in front of the vehicle in the travel direction. Furthermore, a first total light pattern may be produced, in which the illumination range on a first side of a center axis is greater than on the other, second side of this center axis. Furthermore, a second total light pattern is able to be produced, in which the total light pattern is controllable such that it has an illumination range in the direction of at least one detected road user that is less than the distance to the detected road user, and which has an illumination range in another direction that is greater than the distance to the detected road user. A characteristic of the method is that in the switchover from the first total light pattern to the second total light pattern, the illumination range of at least one headlamp on the first side of the center axis is initially reduced to at least such an extent that it is less than the distance to the detected road user, the second total light pattern being produced subsequently.

The center axis, in particular, is the separating line between the road lanes on a straight roadway. In this case the first side of this center axis represents the right lane, and the second side of this center axis represents the left, opposite driving lane. In left-hand driving the sides are reversed.

Different total light patterns may be provided. Moreover, there is back-and-forth switching between these total light patterns. The total light patterns are described in the following text:

The first total light pattern is asymmetrical especially with regard to a longitudinal axis when considering the form of the light-dark cutoff on the road. On the side of the own lane, i.e., on the first side of the center axis, an illumination range is provided that is greater than on the side of the adjacent lane, which represents the oncoming traffic lane on roads having one lane in each direction. On the adjacent lane, the illumination range in particular extends only to a cut-off boundary, so that oncoming road users will not be blinded. The first total light pattern, for example, constitutes a generally known low-beam light pattern. When looking at the light-dark cutoff on a screen situated perpendicularly to the longitudinal vehicle axis, a characteristic 15° increase comes about in the light-dark cutoff in relation to the horizontal line in the low-beam light pattern on the driving side. This 15° increase corresponds to the greater illumination range on the driving side of the vehicle.

A particular characteristic of the second total light pattern, which is also referred to as masked permanent high-beam, is a control of the illumination range as a function of a detected road user or a plurality of detected road users. The illumination range in the direction of such a road user, or in the direction of a plurality of such road users, i.e., in a region having an opening angle which is defined by the width and the distance of the detected road user(s), is less than the distance to the detected road user(s). The distance is defined such that the road user will not be blinded by the second total light pattern. For example, if the detected road user is another vehicle, then the distance may extend to the bumper of the other vehicle. If the other road user is a bicyclist or pedestrian, then the distance may be defined such that it extends to the point at which the other road user makes contact with the ground.

The masked permanent high beam provides an illumination range in another direction that is greater than the distance to the detected road user, the different direction especially being a region laterally adjacent to the opening angle that includes the detected road user. A center region is formed in the second total light pattern, which, in particular, has a lower illumination range in the direction of the detected road user, and side regions which have a greater illumination range are formed on both sides adjacent to this center region. This provides an optimal illumination of the environment of the vehicle in the driving direction for the masked permanent high beam, but ensures that road users in front of the vehicle in the travel direction will not be blinded. When viewing the light-dark cutoff of the masked permanent high beam on a measuring screen situated at a right angle, a horizontal light-dark cutoff is formed in front of the detected road user, in particular, and a perpendicular light-dark cutoff, which corresponds to the greater illumination range in the region adjacent to the detected road user, is formed along the sides of the detected road user. The illumination range in the center region, which, in particular, extends to the detected road user in the second total light pattern, is preferably regulated by an already provided illumination range control.

Finally, a third total light pattern, which hereinafter is also referred to as sliding illumination range, may be provided. In the sliding illumination range, the maximum illumination range is controlled such that it extends to a detected road user. In this case, the illumination range is less than the distance to the detected road user, the illumination range not being static but regulated as a function of the distance to the detected road user. However, in contrast to the masked permanent high beam, no vertical light-dark cutoff in the center of the total light pattern is produced in the sliding illumination range.

The term illumination range denotes an angle-dependent distance on the road, at which the light intensity drops below a limit value. The limit value for the light intensity is defined in the same manner as in the light-dark cutoff. At distances that exceed the illumination range, the light intensity particularly is so low that other road users will no longer be blinded. The angle especially is a horizontal angle, which is formed by a longitudinal axis through a headlamp or a headlamp system on the one side, and a connecting line from a point on the light-dark cutoff and the intersection of the longitudinal axis with a transverse axis extending through the headlamp or the headlamp system.

According to example embodiments of the present invention, the total light patterns are produced by superimposing a first partial light pattern of the first headlamp and a second partial light pattern of the second headlamp. When switching from one total light pattern to the other total light pattern, in particular when switching from the first total light pattern to the second total light pattern, the illumination range of at least the second headlamp, in particular of both headlamps, is reduced on the first side of the center axis. The light emission direction of the second headlamp is then pivoted about a perpendicular pivot axis in order to produce the second total light pattern.

If the second total light pattern, i.e., the masked permanent high beam, is produced by pivoting the light emission direction of the left headlamp outwardly, away from the light-emission direction of the right headlamp in right-hand traffic, so that the angle between the light emission directions of the two headlamps becomes greater, and if the left headlamp on the right side of the center axis, i.e., on the side of the road lane, has a greater illumination range than on the left side of the center axis, i.e., on the oncoming traffic lane, there arises the problem that another road user may be blinded when the light cone of the left headlamp is pivoted. To prevent this, the greater illumination range is initially reduced on the first side of the center axis. Only then will the light emission direction be pivoted toward the outside.

The reduction in the illumination range prior to producing the masked permanent high-beam light, may be realized, for example, in that a so-called city-light function is produced by the headlamp system. The city-light function is characterized in that a symmetrical overall light pattern having a limited illumination range is produced, the illumination range being lower than the maximum illumination range of the first overall light pattern, i.e., the low-beam light, for example. The second headlamp may then be pivoted outwardly, as in a cornering light functionality. The second overall light pattern is produced subsequently.

If a reverse operation takes place, i.e., a switch takes place from the masked permanent high beam to the first overall light pattern, i.e., to low beam, for instance, a city light pattern is first produced, the second headlamp, and possibly also the first headlamp, is then pivoted about a perpendicular pivot axis, and only then is the asymmetrical first overall light pattern generated. This prevents glare for the other road users also in the return switch to the first overall light pattern.

According to example embodiments of the present invention, a headlamp system for a vehicle is furthermore provided. The headlamp system includes at least two headlamps, set apart from each other, for producing an overall light pattern. Furthermore, the headlamp system includes a device for detecting road users in front of the vehicle in the driving direction, and a control unit, which is coupled to the road user detection device and is able to produce a first total light pattern, in which the illumination range on a first side of a center axis is greater than on the other, second side of this center axis; it is also able to produce a second total light pattern in which the total light pattern is able to be controlled such that it has an illumination range in the direction of at least one detected road user that is less than the distance to the detected road user and which has an illumination range in another direction that is greater than the distance to the detected road user. It is characteristic of the method that in the switchover from the first total light pattern to the second total light pattern, the control unit is able to control the headlamps such that the illumination range of at least one headlamp on the first side of the center axis is initially reduced, to at least such an extent that it is less than the distance to the detected road user, the second total light pattern being produced subsequently.

The headlamp system may be able to execute the method completely or partially.

An aspect of example embodiments of the present invention, in particular, relates to the transition from an asymmetrical light pattern, such as a low beam, to the so-called masked permanent high beam. The method and the headlamp system ensure, in particular, that another road user is not exposed to glare in the switchover between these two overall light patterns.

According to example embodiments of the present invention, a method for controlling a headlamp system for a vehicle is provided, in which road users in front of the vehicle in the travel direction are detected. In the method, the headlamp system is able to produce a third total light pattern, in which the light pattern may be controlled such that it has an illumination range in the direction of a detected road user that is less than the distance to the detected road user, and that is greater than, or equal to, the illumination range in other directions. Furthermore, a second total light pattern is able to be produced, in which the total light pattern is controllable such that it has an illumination range in the direction of at least one detected road user that is less than the distance to the detected road user, and which has an illumination range in another direction that is greater than the distance to the detected road user. A characteristic of the method is that during the switchover from one total light pattern to another total light pattern, the illumination range in the direction of the detected road user is controlled by pivoting the light emission direction of the headlamp system about a horizontal axis, such that the illumination range extends to the detected road user.

According to example embodiments of the present invention, a headlamp system for a vehicle is furthermore provided, which has at least two headlamps, set apart from each other, for generating a total light pattern; it also has a device for detecting road users in front of the vehicle in the driving direction. In addition, the headlamp system includes a control unit, which is coupled to the road user detection device and is able to produce a third total light pattern in which the light pattern is controllable such that it has an illumination range in the direction of a detected road user that is less than the distance to the detected road user and greater than, or equal to, the illumination range in other directions. Furthermore, a second total light pattern is able to be produced, in which the total light pattern is able to be controlled such that it has an illumination range in the direction of at least one detected road user that is less than the distance to the detected road user, and it has an illumination range in another direction that is greater than the distance to the detected road user. The headlamp system is characterized by an illumination range control, by which, during the switchover from one total light pattern to another total light pattern, the illumination range in the direction of the detected road user is able to be controlled by pivoting the light emission direction of the headlamp system about a horizontal axis, such that the illumination range extends to the detected road user.

The second overall light pattern, in particular, is the aforementioned masked permanent high beam. The third overall light pattern, in particular, is the afore-mentioned gliding illumination range. In the switchover between these two overall light patterns, it is ensured in particular that the illumination range continuously reaches up to the detected road user. Using the method and the headlamp system provides a permanent and excellent illumination reaching up to a detected road user in a simple and cost-effective manner.

The illumination range control of the headlamp system in particular includes a first actuator for pivoting the light emission direction of at least one headlamp about a horizontal axis. Moreover, the headlamp system may have a second actuator for pivoting the light emission device of at least one headlamp about a vertical axis. This actuator may be, for example, an actuator which is already available for a cornering illumination function.

The headlamp system may include a diaphragm system for the headlamps, which has a diaphragm system including at least two planar diaphragms which are movable in the vertical and/or horizontal direction. In the second total light pattern, i.e., in the masked permanent high beam, the lateral regions form a vertical light-dark cutoff with respect to the center region, which is able to be produced by modifying the vertical position and/or the horizontal position of at least one of the two diaphragms. To displace the two diaphragms vertically and horizontally, the headlamp system in particular has a third actuator, which is coupled with the two diaphragms, in particular. This makes it possible for the different overall light patterns to be produced by only three actuators. As a result, the headlamp system is able to be manufactured and operated in a cost-efficient manner.

According to example embodiments of the present invention, a method for controlling a headlamp system for a vehicle is provided, in which the headlamp system is able to produce at least two total light patterns and allows a switch between the total light patterns. In the method, the driving behavior is recorded and when a switch takes place from one total light pattern to another total light pattern, the time interval for the transition from the one total light pattern to the other total light pattern is determined as a function of the driving behavior.

In the method, a road user is detected in front of the vehicle in the driving direction, in particular, and a total light pattern produced by the headlamp system is controlled such that it has an illumination range in the direction of at least one detected road user that is less than the distance to the detected road user, and which has an illumination range in another direction that is greater than the distance to the detected road user. This total light pattern, in particular, is the afore-mentioned second total light pattern, i.e., the masked permanent high beam.

The driving behavior is determined especially by the driving dynamics and/or the magnitude of the vehicle acceleration, especially the magnitude of the absolute value of the vehicle acceleration. The greater the driving dynamics, i.e., especially the greater the acceleration or the absolute value of the acceleration, the shorter the time interval for the transition from one total light pattern to another total light pattern. This configuration ensures that the transition times are adapted to the driving dynamics, which leads to a switch between the total light patterns that the user perceives as pleasant.

Time interval $\Delta T$ is calculated as a function of acceleration B, in particular in the following manner:

$$\Delta T = -k_1 \cdot \mathrm{abs}(B) + k_2,$$

where $k_1$ $$0.3 \ \mathrm{s^3/m} \leq k_1 \leq 2.0 \ \mathrm{s^3/m}$$

where $k_2$ $$2 \ \mathrm{s} \leq k_2 \leq 10 \ \mathrm{s}$$

where $k_1$ $$0.5 \ \mathrm{s^3/m} \leq k_1 \leq 0.9 \ \mathrm{s^3/m}$$

and where $k_2$ $$4 \ \mathrm{s} \leq k_2 \leq 6 \ \mathrm{s}$$

In particular, $k_1 = 0.7 \ \mathrm{s^3/m}$ and $k_2 = 5 \ \mathrm{s}$.

In addition, the driving behavior may be determined as a function of the driver type. When determining the driver type, the driver may be identified first. Current and possibly also historical data in connection with the driver are then called up, whereupon a particular driver type is assigned to the driver.

Moreover, the user has the option of freely selecting the driving behavior. For example, the driver may define the desired driving behavior prior to the start of a trip, via input.

According to example embodiments of the present invention, a headlamp system for a vehicle is furthermore provided, which includes at least two headlamps, situated at a distance from each other, for generating a total light pattern; it also includes a control unit with whose aid it is possible to produce at least two total light patterns and with whose aid it is possible to switch between the total light patterns. The headlamp system furthermore includes a detection device for detecting the driving behavior. The headlamp system includes a timer; in the switchover from one total light pattern to another total light pattern, the timer is able to determine the time interval for the transition from the one total light pattern to the other total light pattern as a function of the driving behavior.

The two total light patterns may be the first and the second, the first and the third, and the second and the third previously mentioned total light pattern.

The time interval for the transition from one total light pattern to another total light pattern may take place such that an optimal illumination of the environment of the vehicle is achieved as a function of the driving behavior.

According to example embodiments of the present invention, a method for controlling a headlamp system of a vehicle is provided, which detects preceding or oncoming road users in front of the vehicle in the driving direction and controls the light pattern produced by the headlamp system such that it provides an illumination range in the direction of a detected preceding road user that is less than the distance to the detected preceding road user, and whose illumination range in the direction of the adjacent road lane is switched back and forth as a function of the detection of another, in particular an oncoming, road user, the switch taking place between at least a first illumination state having greater illumination of the adjacent road lane, and a second illumination state having lower illumination of the adjacent road lane. The switch between the two illumination states for the illumination range in the direction of the adjacent road lane may be delayed as a function of the detection rate of the additional road users, in particular oncoming road users.

The light pattern produced by the headlamp system, in particular, is the afore-mentioned second total light pattern, i.e., the masked permanent high beam. In the two illumination states of this total light pattern, the illumination range of a side region adjacent to a first detected road user is adapted as a function of the detection of another road user. If the adaptation goes so far that the illumination range in the side regions corresponds to the illumination range of the center region of the masked permanent high beam, then this has the result that the first illumination state of the light pattern corresponds to the masked permanent high beam and the second illumination state corresponds to the light pattern of the afore-mentioned third total light pattern, i.e., the sliding illumination range.

In particular, the more frequently additional road users are detected, especially oncoming road users, the greater the delay time. With each detected further road user, for instance, the delay time is extended by an extension interval and the delay time is shortened using a defined time reduction rate. If necessary, however, a minimum value and a maximum value may be specified for the delay time, so that the delay time does not become arbitrarily long when very high traffic density is encountered. The special selection of the delay time ensures that a pleasant illumination pattern is produced for the driver, which does not become distracting as a result of excessive changes.

Furthermore, it is possible to define the extension interval as a function of the particular horizontal angular position at which the additional, in particular oncoming, road user has been detected. More specifically, it may be taken into account whether the road user appears on the left or right side or in the center in front of the vehicle. Finally, the extension interval and/or the reduction rate may also be determined as a function of the vehicle speed. For example, in a speed range that is typical for county roads, the delay time may be increased only slowly when oncoming road users are detected, but lowered rapidly. In contrast, at high speeds as they are typically encountered on an expressway, a newly detected additional road user may cause a considerable extension of the delay time, the reduction of the delay time through the reduction rate being implemented slowly.

For instance, the delay time lies within a range of one second to 400 seconds, in particular within a range of 2 seconds to 200 seconds.

According to example embodiments of the present invention, in the light pattern in the direction of the detected road user, a center region having a low illumination range and, adjacent to this center region on both sides, a first and a second side region having a greater illumination range are formed when no oncoming road user has been detected. In this case, a masked permanent high beam is therefore provided, in which the second side region illuminates the adjacent road lane. If the first, i.e., the right side region, has a greater illumination range than the center region, the reduction rate in such a case is greater than in cases where the first side region has a lower illumination range than the center region or the same illumination range as the center region. In this case the adjacent lane is therefore reilluminated more rapidly when the other side region of the masked permanent high beam is fully illuminated. Under these circumstances, the illumination of the first side region is activated or deactivated also as a function of the detection of a road user, in particular. Overall, the method makes it possible for the most part to provide a calmer light pattern when the traffic volume is higher.

According to example embodiments of the present invention, the curvature of the road is determined, and if the curvature exceeds a limit value, a switch to the second illumination state takes place, which provides for a lower illumination of the adjacent lane. The curvature of the road may be determined from data ascertained by sensors of the vehicle, such as the temporal change of the steering angle, or with the aid of the current position of the vehicle and a digital geographical map available in the navigation system, for instance.

According to example embodiments of the present invention, a headlamp system for a vehicle is furthermore provided, which has at least two headlamps, set apart from each other, for generating a total light pattern, and a device for detecting road users driving in front of the vehicle in the driving direction, as well as oncoming road users. In addition, the headlamp system includes a control unit, which is coupled to the road user detection device and with whose aid a total light pattern is able to be generated which is controllable such that it has an illumination range in the direction of a detected preceding road user that is lower than the distance to the detected preceding road user; furthermore, its illumination range in the direction of the adjacent road lane is switched back and forth as a function of the detection of an oncoming road user, the switch taking place between at least a first illumination state providing greater illumination of the adjacent road lane, and a second illumination state providing lower illumination of the adjacent road lane. The control unit has a delay unit, which makes it possible to delay the switch between the two illumination states for the illumination range in the direction of the adjacent lane as a function of the detection rate of oncoming road users.

Thus, excessive back-and-forth switching between different light patterns may be prevents. This calms the produced light patterns and avoids distraction of the driver by the changes in the light patterns.

According to example embodiments of the present invention, a method for controlling a headlamp system of a vehicle is provided, by which the road user is detected in front of the vehicle in the driving direction, in particular, and a total light pattern produced by the headlamp system is controlled such that it provides an illumination range in the direction of at least one detected road user that is less than the distance to the detected road user, and which provides an illumination range in another direction that is greater than the distance to the detected road user. The illumination range in the other direction may be controlled as a function of the horizontal angle between the driving direction of the vehicle and the connecting line from the vehicle to the detected road user or to another detected road user. The light pattern produced by the headlamp system in particular is the afore-mentioned second total light pattern.

The smaller the horizontal angle, the greater the illumination range, especially in the other direction. According to example embodiments of the present invention, the following holds true for illumination range L in the other direction:

$$LW = L_{max}(-m\Phi + n),$$

$L_{max}$ being the maximum illumination range, $\Phi$ being the horizontal angle, the following applying to m:

$$0.167 \text{ Grad}^{-1} \leq m \leq 0.4 \text{ Grad}^{-1},$$

In particular:

$$0.2 \text{ Grad}^{-1} \leq m \leq 0.3 \text{ Grad}^{-1}$$

and especially preferably, $$m = 0.25 \text{ Grad}^{-1}$$

and for n:

$$1 \leq n \leq 1.2,$$

In particular:

$$1.1 \leq n \leq 1.15$$

and especially preferably, $$n = 1.125.$$

In addition, it is preferably stipulated that the illumination range corresponds to the maximum illumination range up to a particular angle, and that the illumination range is minimal starting at a particular angle. For horizontal angles $\Phi \leq \Phi_1$ the illumination range in the other direction corresponds to the maximum illumination range, $\Phi_1$ lying in a range of 0° to 2°, in particular 0.2° to 0.8°. Furthermore, for horizontal angles $\Phi \leq \Phi_2$ the illumination range in the other direction corresponds to the minimum illumination range, $\Phi_2$ lying in a range of 3° to 6°, in particular from 4° to 5°.

With the aid of the afore-mentioned parameters, it is possible to ensure that the reduction in the illumination range when an oncoming road user is encountered, or when a road user is passed, does not occur too abruptly. This measure, too, contributes to a calmer light pattern.

The illumination range in the other direction is controlled in particular as a function of the horizontal angle between the driving direction of the vehicle and the connecting line from the vehicle to the other detected road user. In this case, the light pattern illuminates the opposite road lane, among other things.

Furthermore, the illumination range in the other direction is able to be controlled as a function of the horizontal angle between the driving direction of the vehicle and the connecting line from the vehicle to the detected road user. In such a case, in a passing maneuver, the light pattern in the other direction illuminates the region adjacent to the road lane of the detected road user, that is to say, the right region adjacent to the road user being passed in right-hand traffic. The control of the illumination range in the other direction may be implemented in particular once a signal has been set for a passing maneuver in the direction of the opposite driving lane, e.g., the turn signal indicator was actuated in the direction of the oncoming traffic lane.

According to example embodiments of the present invention, a center region that provides a lower illumination range and, adjacent to this center region on both sides, side regions that provide a greater illumination range are formed in the light pattern in the direction of the detected road user, i.e., the second total light pattern is provided. In this case the illumination range in a side region is controlled as a function of the horizontal angle between the driving direction of the vehicle and the connecting line of the vehicle and the detected road user or the additional detected road users.

When controlling the illumination range as a function of the horizontal angle, a hysteresis may be run through as well in the individual case.

A headlamp system for a vehicle is furthermore provided, which has at least two headlamps, set apart from each other, for generating a total light pattern; it also has a device for detecting a road user in front of the vehicle in the driving direction. The headlamp system furthermore includes a control unit, which is coupled to the road user detection device and with whose aid a total light pattern is able to be produced, which is controllable such that it has an illumination range in the direction of at least one detected road user that is less than the distance to the detected road user, and which has an illumination range in another direction that is greater than the distance to the detected road user. The headlamps may be controllable with the aid of the control unit, such that the illumination range in the other direction is able to be controlled as a function of the horizontal angle between the driving direction of the vehicle and the connecting line from the vehicle to the detected road user or to another detected road user.

The light pattern may be controlled especially when a vehicle is driving in front of the own vehicle and when another vehicles approaches from the opposite direction, or the own vehicle is passing a vehicle driving ahead. In such a case it is ensured that the produced total light pattern does not change too abruptly.

According to example embodiments of the present invention, a method for controlling a headlamp system for a vehicle is provided, in which at least two total light patterns are able to be produced and a back-and-forth switch between the total light patterns is possible. In the method, road users in front of the vehicle in the driving direction are detected. One of the two total light patterns is selected as a function of the detection rate of other road users.

The method may ensure that a specific total light pattern is able to be produced when the traffic density is too high, i.e., when a high number of road users is detected within a time interval. The two total light patterns are, in particular, the afore-mentioned second total light pattern, i.e., the masked permanent high beam, and the third total light pattern, i.e., the sliding illumination range. If the detection rate exceeds a specific limit value, then the sliding illumination range is produced as the total light pattern. It can then be prevented that the areas of the masked permanent high beam that have a very high illumination range must be activated and deactivated too frequently.

According to example embodiments of the present invention, the total light pattern furthermore is selected as a function of the position of other detected road users and/or the vehicle speed. For example, a first step size is produced with each detected road user. The first step sizes produced with each detected road user are integrated, and a second step size, which is a function of the vehicle speed, is subtracted from the integrated step size. This generates a first output signal, which characterizes one of the total light patterns. The first step size may additionally depend on the vehicle speed as well.

According to example embodiments of the present invention, the selection of the total light pattern alternatively or additionally is made as a function of temporal steering angle changes of the vehicle. In particular, a first steering angle value is produced as a function of changes in the steering angle. Furthermore, a second steering angle value is produced as a function of the vehicle speed and the steering angle. A second output signal, which characterizes one of the overall light patterns, is then produced as a function of the value of the first and the second steering angle. Taking the temporal steering angle changes into account makes it possible to detect a winding roadway. On winding roads, the use of certain total light patterns, such as the masked permanent high beam, is disadvantageous. When traveling on winding roads, the method makes it possible to produce a total light pattern that is suitable for roads of this type. For example, a sliding illumination range may be produced under these circumstances.

According to example embodiments of the present invention, the third total light pattern is generated when the first and the second output signal characterize this total light pattern. Moreover, when switching back and forth between both total light patterns, a hysteresis may be run through in order to prevent excessive switchovers.

According to example embodiments of the present invention, a headlamp system for a vehicle is furthermore provided, which has at least two headlamps, set apart from each other, for generating two total light patterns; it also has a control unit, which is able to switch back and forth between the two total light patterns, and a device for detecting road users in front of the vehicle in the driving direction. One of the characteristics of the headlamp system is that the control unit is designed to allow one of the two total light patterns to be selected as a function of the detection rate of other road users.

In particular, the headlamp system may be able to execute the steps of the method, either completely or partially.

The following text describes further features and aspects of example embodiments of the present invention, which are able to be combined with all of the afore-mentioned aspects and with each other in various manners.

In the method, the switchover from one total light pattern to another total light pattern may take place automatically, especially as a function of the detection of a road user. In addition, it is also possible that the switchover from one total light pattern to another total light pattern is triggered by an actuating action of a user.

The energy consumption of at least one total light pattern may be adjustable. The second total light pattern, in particular, is able to be operated in an energy-saving mode, as so-called high beam assistant, which switches back and forth only between low beam and conventional high beam lights. Energy is saved in this energy-saving mode because of the reduced movement frequency, in particular the less frequent operation of actuators.

In the method, it may furthermore be detected whether travel is taking place on a multi-lane road. A multi-lane road means that multiple adjacent driving lanes are assigned to the same driving direction. If a multi-lane road has been detected, a switch is made to an illumination state for the adjacent road lane, in which this neighboring lane is illuminated using a lower illumination range. For instance, it is possible to switch to the third total light pattern for the sliding illumination range.

A hysteresis may be run through in the back-and-forth switch between two total light patterns. In particular, a hysteresis may be run through during the back-and-forth switch between the two illumination states for the illumination range in the direction of the adjacent lane. Thus, excessive back-and-forth switching between two total light patterns may be avoided. This leads to a calmer light pattern.

In the method and in the headlamp system, other road users are detectable with the aid of a camera, in particular a CCD camera having downstream image processing software, and/or a laser, infrared and/or radar sensor. These sensors detect whether another road user is present in a detection range. If this is the case, the position of the other road user in relation to the own vehicle is detected in addition. This makes it possible to detect not only illuminated road users, but also road users who have no light sources of their own, such as pedestrians, for instance.

In all of the afore-mentioned aspects, the road user, provided it is an illuminated vehicle, is able to be detected in front of the vehicle in the driving direction, in particular by recording an image of a traffic area in the visible spectral range, extracting from the image cohesive areas having a brightness that exceeds a threshold value, classifying the areas at least as a function of their size, forming a confidence value for each area, which represents a measure for the similarity of the area of the image to a vehicle light, based on the classification of the area and a physical quantity assigned to the area, and finally, making a determination as to whether an area is assigned to a vehicle light as a function of the confidence value.

The method takes into account that bright areas of the image that come from very distant light sources differ from bright areas that come from close light sources. The bright areas of the images are classified based on this differentiation. However, since the classification in many cases does not allow a clear assignment of an area to a vehicle light, a confidence value is subsequently determined, at least for the areas that cannot be unequivocally assigned to a vehicle light. Based on this confidence value it is then possible to determine in very reliable manner whether an area may be assigned to a vehicle light.

According to example embodiments of the present invention, a classification value is obtained from characteristics of this area in the classification. This classification value is assigned to each area, and the confidence value is formed from the classification value of the area and the physical quantity. The classification value describes how well, or how unequivocally, the area is able to be assigned to the particular class in the classification. Therefore, the classification value represents a differentiation within a class.

Characteristics for each region, in particular, are determined for the classification. These characteristics may include, for example, the brightness of the area, the form or outline of the area, and/or the color within the area. In addition, the characteristics may include values for the center of mass, the dimension and/or the main axes of the area, and additionally or alternatively, values for the intensity of monochromatic pixels of the area. For the intensity of monochromatic pixels of the area, the maximum intensity, a mean value, the standard deviation, the position of the maximums within the area, the distribution of the histogram, and/or the value of the average gradient may be taken into account. Furthermore, as an alternative or in addition, these values may be determined only for pixels of one color that corresponds to the color of a tail light of a vehicle, i.e., red in the standard case.

Moreover, it is possible to consider characteristics which may be used to obtain color information indirectly, by defining various comparisons between monochromatic and red pixels, such as the ratio between the mean value of the monochromatic level and the average value of the red level. "Monochromatic" in this context also denotes the gray-scale value or the brightness in this area.

Finally, the use of the method allows a mean value of the characteristics to be formed while taking a plurality of consecutive images into account.

According to example embodiments of the present invention, the classification values of the areas are obtained with the aid of a learning algorithm, and the classification values are subsequently assigned to discrete weighted classification values. The confidence value is then formed from the weighted classification value of the area and the physical quantity.

According to example embodiments of the present invention, the physical quantity utilized when forming the confidence value is the maximum gray-scale value within the area, in particular the maximum gray-scale value within the area normalized across the maximally possible gray-scale value. When the confidence value is determined in this manner it is taken into account that vehicles that are in closer proximity to the own vehicle generate brighter areas in the image than vehicles at a greater distance. Accordingly, areas assigned to vehicles that are in the vicinity of the own vehicle have a higher confidence value than areas assigned to vehicles at a greater distance. Furthermore, a bright area caused by a reflection of the own vehicle lights receives a lower confidence value, and this confidence value is reduced even further if the reflection is caused by an infrastructure element that is located at a great distance.

Whether an area may be assigned to a vehicle light or a vehicle to the lights may already be determined on the basis of the classification. The confidence value is then formed only for those areas to which a vehicle light cannot be assigned unequivocally based on the classification.

According to example embodiments of the present invention, the environment of the areas may be examined in order to improve the reliability of the method, it being determined in the process whether an additional area appears in the vicinity of an area, so that the two areas may be assigned to two headlamps or tail lights of a vehicle. In other words, areas are paired. This makes it possible to obtain indications of twin areas, which may be assigned to lights of motor vehicles, in particular. The classification value of an area is adaptable on the basis of this examination.

According to example embodiments of the present invention, the temporal development of an area may be tracked on the basis of an image sequence. However, since tracking of the areas is often difficult, the method may also be implemented independently of such area tracking, by determining the temporal coherence of the confidence values. In this case, a confidence value is varied as a function of its temporal coherence. An accumulation field, in particular, in which the confidence value is summed up for the pixels of the image, is formed for this purpose. In the transition from one image to the next image, for example, the confidence value for a pixel may be reduced by a fixed value in the accumulation field, and increased by the confidence value of the corresponding pixel of the following image. In addition, in the transition from one image to a following image, the area in the accumulation field may spread as a function of the expected movement of an object assigned to the area. Finally, based on the temporal development of the accumulation field, it is possible to determine whether an area will be assigned to a vehicle light, the confidence values of the accumulation field then being subjected to a temporal hysteresis.

An advantage of determining the temporal coherence of the confidence values is that the difficult tracking of a region within an image sequence is dispensed with. To arrive at a reliable assignment of the regions to vehicle lights, it is sufficient to consider the accumulation field for only very few full images, so that a very rapid assignment is possible.

According to example embodiments of the present invention, the traffic region in a horizontal opening angle of more than 40° is recorded. The advantage of using such an opening angle is that the image may be employed not only for detecting vehicles when it is dark, but that it may also be utilized by other vehicle applications, especially driver assistance systems. However, such an opening angle makes it is difficult to substantiate vehicle lights at a great distance. According to example embodiments of the present invention, the image is therefore recorded by a sensor which has an area that is sensitive only in the particular wavelength range that corresponds to the tail light color of a vehicle, i.e., generally red, and which has another area that detects the brightness of the incident light, especially in the visible spectrum. The region that detects the brightness of the incident light in particular does not detect light from the near infrared range.

The region lying in the wavelength range that corresponds only to the color of a vehicle tail light takes up 25%, for instance.

The image is recorded by a monochrome camera, in particular.

Example embodiments of the present invention are explained in more detail below with reference to the appended Figures.

DETAILED DESCRIPTION

Figure 1:
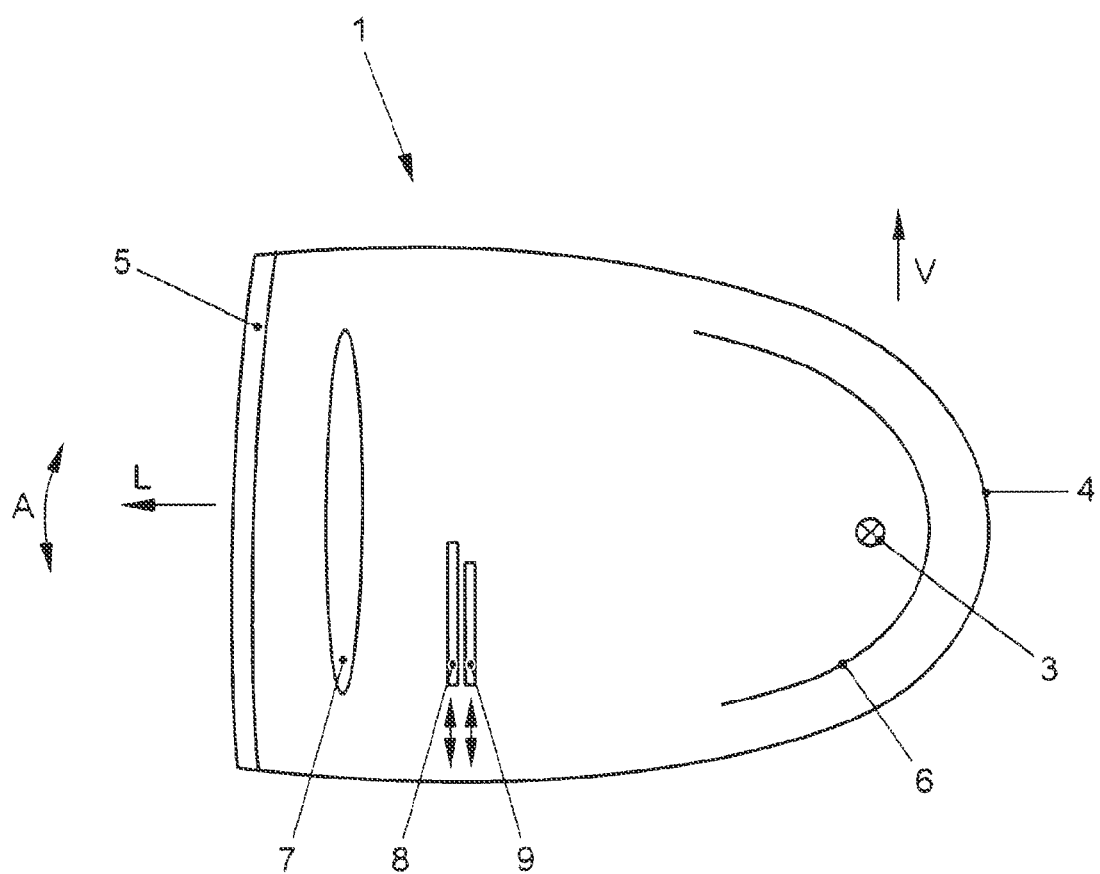
FIG. 1 schematically shows a headlamp of the headlamp system according to an example embodiment of the present invention.
Figure 2:
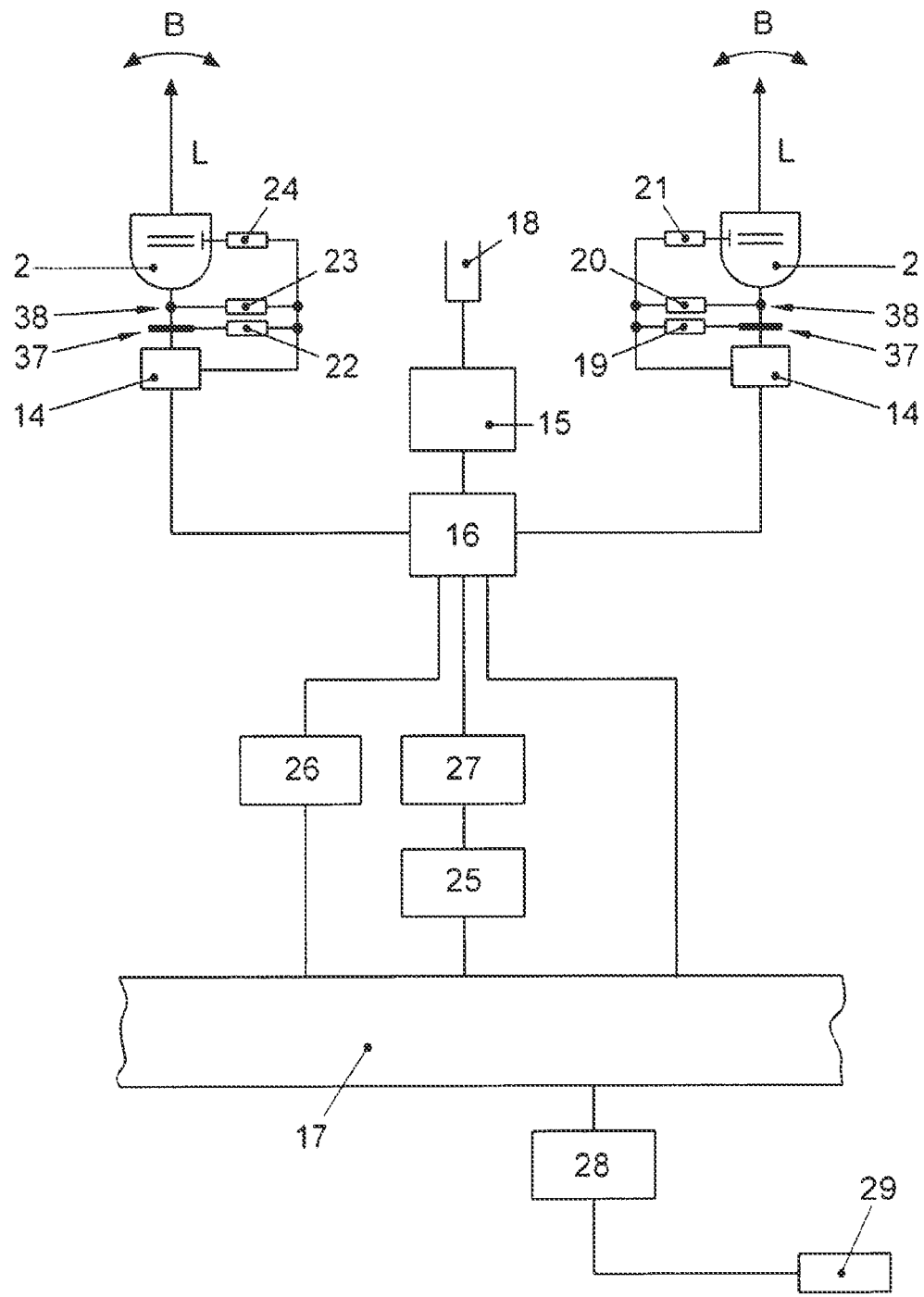
FIG. 2 schematically shows the headlamp system according to an example embodiment of the present invention.

The headlamp system, which is shown in schematic form in FIG. 2, includes two projection headlamps 1 and 2 which are set apart from each other and situated in the front on the right and left side of the vehicle, e.g., in a conventional manner. One of these projection headlamps 1, 2 is shown in FIG. 1. Projection headlamp 2 situated on the other side has substantially the same design.

FIG. 1 shows a section of projection headlamp 1 in a plane that is parallel to the plane defined by the longitudinal vehicle axis and vertical V. In the conventional manner, projection headlamp 1 includes a light source 3, which is surrounded by a reflector 6 implemented as rotation ellipsoid. Reflector 6 thus has two focal points. Light source 3 is located in one of the focal points of reflector 6. The light emitted by light source 3 is reflected by reflector 6 in light emission direction L of projection headlamp 1, in the direction of a projection lens 7. A diaphragm array having planar diaphragms 8 and 9 is disposed at the focal point of projection lens 7 and near the second focal point of reflector 6. The normals of planar diaphragms 8 and 9 are aligned substantially in parallel to light emission direction L. Light source 3, reflector 6, lens 7, and diaphragms 8 and 9 are situated inside a housing 4, which is closed off by a glass disk 5. The shape of the light-dark cutoff of the total light pattern of projection headlamp 1 is modifiable by moving diaphragms 8 and 9 in the vertical and/or horizontal direction.

The manner in which various total light patterns are able to be produced by moving diaphragms 8 and 9 is described in German Published Patent Application No. 10 2007 045 150, for instance, which is expressly incorporated herein in its entirety by reference thereto.

An exemplary embodiment of the headlamp system equipped with a headlamp 1, 2 on the right and left side, respectively, as it is shown in FIG. 1, will be described in the following text with reference to FIG. 2.

Right headlamp 1 of the headlamp system is connected to a control unit 13, and left headlamp 2 is connected to a control unit 14. Control units 13 and 14 control the partial light patterns of headlamps 1 and 2, which, when superimposed, produce a total light pattern.

Control units 13 and 14 control an illumination range regulation for headlamps 1 and 2, in which headlamps 1 and 2 are pivotable about a horizontal axis 37 with the aid of actuator 19 or 22. This makes it possible to pivot light emission direction L of the headlamps in the direction of arrow A (FIG. 1). Furthermore, control units 13 and 14 control actuators 20 and 23, respectively, with whose aid headlamps 1 and 2 are pivotable about a vertical axis 38. Using actuators 20 and 23, light emission direction L of headlamp 1 or headlamp 2 is able to be pivoted in the direction of arrow B. Actuators 20 and 23 are part of an already existing cornering light, for example. Finally, control units 13 and 14 control the vertical and/or horizontal position of diaphragms 8 and 9 of the diaphragm arrays for right and left headlamp 1, 2 with the aid of actuators 21 and 24.

Different total light patterns which are able to be produced by headlamps 1 and 2 of the headlamp system will be described in the following text with reference to FIGS. 3-7.

Figure 3:
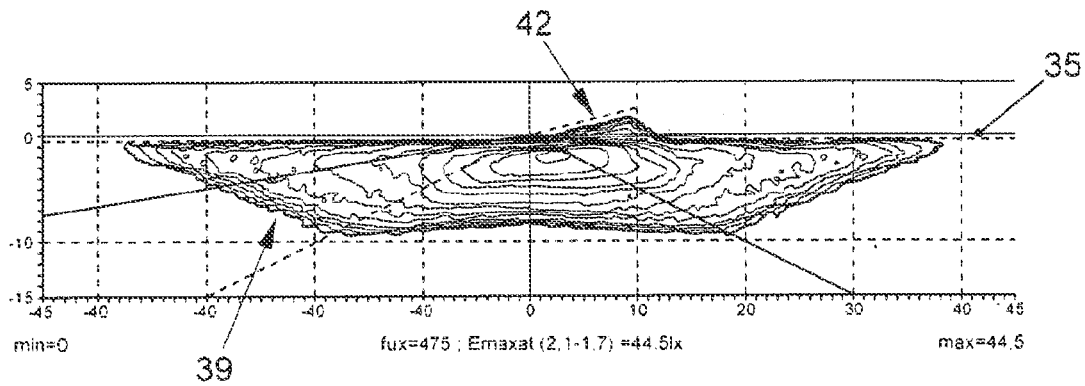
FIG. 3 shows the emission characteristic of the first total light pattern on a measuring screen, produced by the method according to an example embodiment of the present invention.
Figure 4:
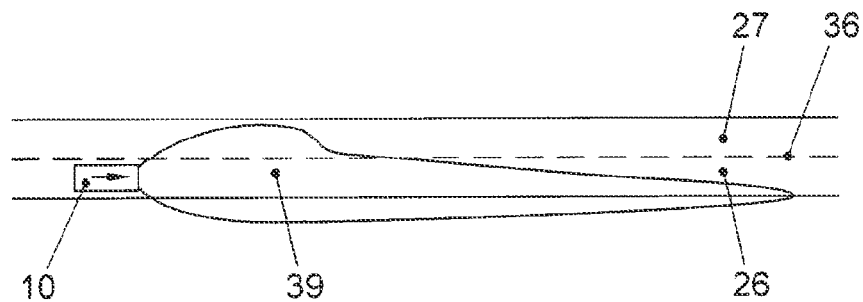
FIG. 4 shows the emission characteristic of the first total light pattern on a road produced by the method of an example embodiment of the present invention.

First total light pattern 39 produced by the headlamp system is shown in FIG. 3 as an Isolux diagram on a measuring screen, and in FIG. 4, by a light-dark cutoff on a road. Total light pattern 39 is asymmetrical with regard to a center axis 36, which, in the case of a straight road, delimits road lane 26 of vehicle 10 having the headlamp system from oncoming road lane 27. The illumination range in the region of oncoming lane 27 is much lower than the illumination range in the region of lane 26 and, for right-hand traffic, also lower than on the right side adjacent to lane 26. This asymmetry is also apparent from the light pattern on the measuring screen shown in FIG. 3. An increase 42, which encloses an angle of 15° with horizontal 35, results on the right side of first total light pattern 39. In the exemplary embodiment, the characteristic of the light-dark cutoff or the light pattern on the measuring screen corresponds to the requirements of the current European ECE-R 112 standard for a low beam light of a headlamp.

Figure 5:
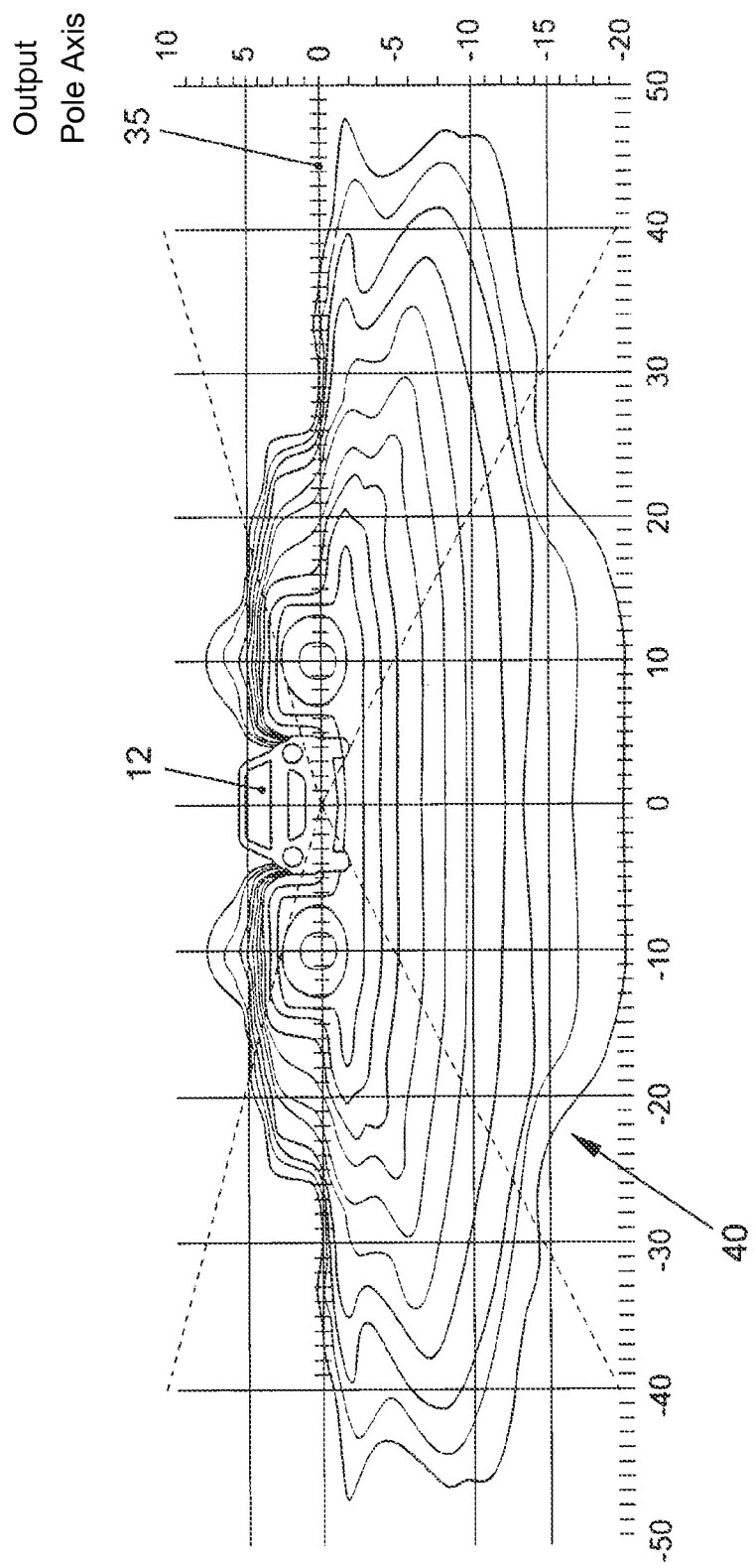
FIG. 5 shows the emission characteristic of the second total light pattern on a measuring screen produced by the method of an example embodiment of the present invention.
Figure 6:
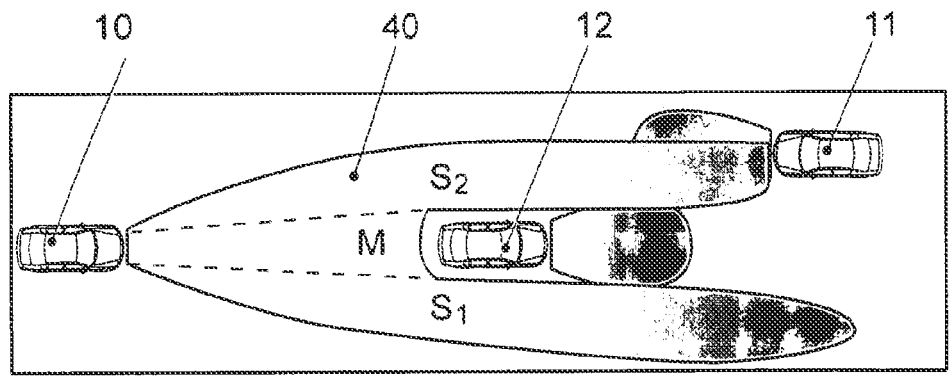
FIG. 6 shows the emission characteristic of the second total light pattern on the road produced by the method of an example embodiment of the present invention.

FIG. 5 shows second total light pattern 40 produced by the headlamp system and the method, in the form of an Isolux diagram on a measuring screen, and FIG. 6 depicts it as light-dark cutoff on the road. Second total light pattern 40 is a masked permanent high beam. A characteristic of this total light pattern 40 is that it has an illumination range in the direction of a detected road user 12, i.e., in region M of total light pattern 40, which is controlled such that it is at least less than the distance to detected road user 12 and, in particular, extends to other road user 12. If other road user 12 is a preceding vehicle, then the illumination range in region M of total light pattern 40 may extend to the rear bumper of preceding vehicle 12, for example.

A side region $S_1$ in which the illumination range is greater than the illumination range in region M of total light pattern 40, is formed on at least one side adjacent to center region M in the direction of detected road user 12. That is to say, the illumination sweeps around road user 12 in order to provide the driver of vehicle 10 with better illumination of the traffic area in front of vehicle 10. The illumination range in side region $S_1$ may correspond to the illumination range in a conventional high beam functionality, for instance. Side region $S_2$ which likewise has a larger illumination range than the illumination range in center region M, is preferably formed also on the other side in second total light pattern 40. The illumination range of side region $S_2$, too, may correspond to the illumination range of a conventional high beam functionality, so that total light pattern 40 may correspond to a conventional high beam, in which an area of detected road user 12 and an area in front of road user 12 in the driving direction is cut away in the light pattern. This provides the driver of vehicle 10 with optimal illumination of the road space, without blinding other road users 12. If yet another road user, such as an oncoming vehicle 11, is detected in the area of illumination of the headlamp system, the illumination range may furthermore also be controlled in the direction of this road user 11, such that it extends only to this road user 11.

In the case illustrated in FIG. 6, the illumination range in side region $S_2$ of second total light pattern 40 is continually adapted to the distance between own vehicle 10 and oncoming vehicle 11. Furthermore, it is possible to select the width of center region M in such a way that all detected road users, i.e., vehicles 11 and 12 shown in FIG. 6, for example, are located within the corridor between side regions $S_1$ and $S_2$. But in this case, as well, the illumination range for second side region $S_2$ is able to be controlled in particular as a function of the position of an oncoming vehicle 11, as will be explained in the further text.

As described in detail later on, data in connection with other road users in front of vehicle 10 in the driving direction are continuously transmitted to control unit 16 by an image-processing unit 15 in order to control the illumination range in center region M and possibly in side regions $S_1$ and $S_2$. Depending on the position of other detected road users 12 and/or 11, control unit 16 transmits control signals to control units 13 and 14 for headlamps 1 and 2. Control units 13 and 14 thereupon control actuators 19 through 21 for right headlamp 1 and actuators 22 through 24 for left headlamp 2 such that desired second total light pattern 40 is generated. In the process the vertical light-dark cutoff is produced by tilting headlamps 1 and 2 about vertical axes 38, on the one hand, and by actuating diaphragms 8 and 9 by means of actuators 21 and 24 on the other. In contrast, the horizontal light-dark cutoff in center region M, i.e., the illumination range in center region M, is not produced by shifting diaphragms 8 and 9, but preferably exclusively by the illumination range control, i.e., by tilting headlamps 1 and 2 about horizontal axis 37 with the aid of actuators 19 and 22.

The terms horizontal and vertical used with regard to the light-dark cutoff refer to the light pattern on a measuring screen situated perpendicularly to light emission direction L. In this case, a horizontal light-dark cutoff is disposed parallel to horizontal axis 35, which is situated 10 centimeters below the installation height of headlamps 1 and 2, with a shield situated at a distance of 10 meters. A vertical light-dark cutoff extends perpendicularly to horizontal axis 35.

Figure 7:
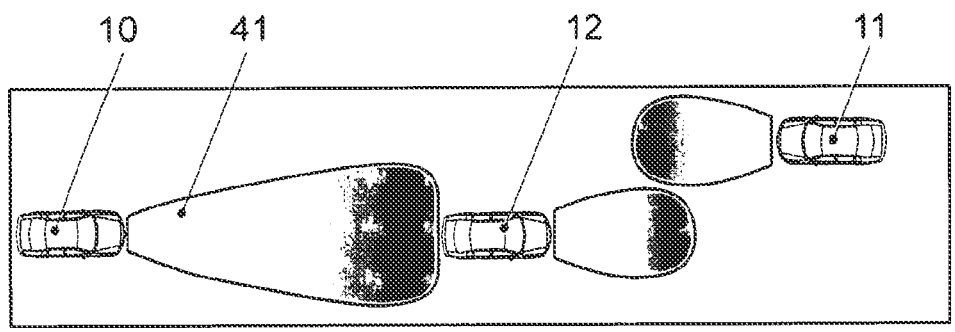
FIG. 7 shows the third total light pattern on the road produced by the method of an example embodiment of the present invention.

FIG. 7 shows a third total light pattern 11 as light-dark cutoff on a road, the pattern being produced by the headlamp system and with the aid of the method. This third total light pattern 41 is also called sliding illumination range. It is characterized by the control of the maximum illumination range of light pattern 41 such that it extends to a detected road user 12 in front of vehicle 10 in the driving direction. This third total light pattern 41 thus ensures an optimal illumination that extends to the other detected road user 12, but will not blind this road user 12. Side regions $S_1$ and $S_2$ of the masked permanent high beam are not provided, however. Third total light pattern 41 is substantially symmetrical with regard to a vertical plane extending between headlamps 1 and 2 in the direction of light emission direction L. The maximum illumination range in third total light pattern 41 is substantially produced across the entire opening angle, as illustrated in FIG. 7. However, the opening angle is selected such that oncoming vehicles 11 on the opposite lane will not be blinded when passing vehicle 10 having third total light pattern 41. The control of the maximum illumination range of third total light pattern 41 is implemented by diaphragms 8 and 9, i.e., it differs from the control of the illumination range in center region M of second total light pattern 40.

Furthermore, a device for detecting a road user in the driving direction of the vehicle, i.e., usually in the direction of light emission L of headlamps 1, 2, is provided. This detection device, as shown in FIG. 2, may be a camera 18 having a connected image-processing unit 15, which detects the lights of vehicles 11, 12 driving ahead or approaching from the opposite direction. The direction of these lights both in a horizontal and a vertical direction are detectable with the aid of image-processing unit 15. The scene recorded by the forward-facing camera is analyzed by image-processing unit 15. In this scene the position of the lights of vehicles 11, 12 driving ahead and approaching from the opposite direction is detected. Based on the horizontal distance of two headlamps or tail lights of another vehicle 11, 12, the image processing is additionally able to infer the width of the vehicle. Light sources of other road users are able to be recorded as well. Finally, it is possible to detect light sources which indicate street lights or a locality. Street lights are usually able to be distinguished from vehicle lights by the position in the camera image or by the intensity, which is frequency-modulated by the grid. The opening angle of the camera preferably corresponds to the opening angle of the headlamp system.

According to another configuration of the system, detection device 15 is implemented as laser or radar sensor, by which the distance of objects in the direction of light emission direction L is able to be measured. In so doing, road users that are not illuminated or insufficiently illuminated, in particular, such as pedestrians or possibly also bicycle riders are detectable as well. In addition, it is possible to use the distance measurement to selectively detect road users located within the glare boundaries of a light pattern. Finally, an excellent classification of vehicles or road users may be implemented via the measurement of distance, speed and movement direction of road users, so that a faulty control of the headlamp system is avoided. The vertical angle, i.e., the distance from the own vehicle, may be calculated from the distance of the object, the angle being usable as control quantity for the headlamp system.

In addition, utilizing the distance measurement of the laser or radar sensor, it is possible to distinguish between a moving vehicle and stationary objects by a speed detection. Moreover, using a scanning laser distance meter, the width of the detected objects is able to be measured, so that the type of objects, i.e., whether they involve a road user, a motor vehicle, a bicycle rider or a guidepost, may be inferred with greater certainty.

The laser or radar sensor may also be combined with a camera in order to increase the detection reliability, especially with regard to detecting the vertical position of the road user.

Since cameras, laser and radar sensors are increasingly used in vehicles equipped with driver assistance systems, this sensor technology may be used for controlling the headlamp system as well without creating additional expense.

A device for detecting a road user according to an exemplary embodiment of the present invention will be described in detail in the following text with reference to FIGS. 8 through 11:

In this case the detection device includes a sensor, which records an image of a road section in the visible spectral range. The sensor, for instance, may be situated behind the windshield in the driving direction and be aligned with the road in front of the vehicle. The sensor is a monocular image recording system, which is able to detect, in real time, light sources located in front of the own vehicle at a distance of more than 600 m. Headlamps of another vehicle at a distance of 600 m and tail lights of another vehicle at a distance of more than 400 m, in particular, are detectable.

The sensor may be integrated into camera 18 and utilized not only for image recordings which are used for the control of headlamps 1, 2 of the vehicle once the images have been processed. Instead, the image recordings of the sensor are also able to be used for other driver assistance systems such as a lane track assistance and road sign detection system. This multiple use of the sensor lowers the costs in the production of the vehicle.

In darkness, vehicles are usually detected based on the light emission of their headlamps or the light emission of their tail lights. It is apparent that simply forming a threshold value for the luminous intensity occurring in the recorded image does not lead to a reliable vehicle detection. The light emitted by the vehicle itself, which is reflected at different objects located within the road section in front of the vehicle, back to the vehicle, makes it difficult to distinguish between such reflections of the own light and other vehicles for medium and large distances. Both the sensor and the subsequent image processing of the image recorded by the sensor must therefore be adapted to this problematic situation.

First of all, to allow an effective differentiation between a headlamp and a tail light, the sensor has an area that is sensitive only in the wavelength range that corresponds to the color of the tail light of a vehicle, in other words, this sensor region is sensitive to red light exclusively. However, since in contrast to monochromatic sensors, i.e., sensors which measure the brightness or the gray-scale value, the sensor also includes a region which detects the brightness in the visible spectral range. The sensor region for the brightness uses 75% of the pixels in this sensor, and the region for red light, 25% of the image pixels. If such a sensor is used, it is possible to record images that are also usable by other applications.

The horizontal opening angle of the sensor is greater than 40°, for example. Such an opening angle makes it difficult to detect tail lights at a great distance. For example, a tail light having a size of 10 cm×10 cm is imaged by less than one pixel of the sensor at a distance of more than 100 m. On the other hand, the light emitted by the tail light forms a larger cone, so that a tail light at an approximate distance of 400 m is still imaged in an area of approximately 4 to 10 pixels. However, in order to obtain color information from the image provided by the sensor, the preceding filter system having one red and three pixels without color filter, a so-called Bayer matrix, is used. The sensor includes 2×2 blocks having a single sector that is sensitive in the red spectral range, and three conventional monochrome detectors, which have a higher sensitivity than color-sensitive detectors, but which also detect light in the red spectral range. Such a sensor makes it possible to distinguish red light sources from white light sources, while simultaneously providing high sensitivity for the pixels without color filter, however. It is pointed out that the sensor is insensitive in the near-infrared range and works with 10 bits per pixel using a logarithmic curve, which substantially prevents completely saturated pixels, in which information is lost.

The sensor is connected to an image-processing unit 15. Image processing unit 15 analyzes the image recorded by the sensor in such a way that light image areas of the recorded image are able to be assigned to vehicles in the traffic environment of the own vehicle. The image processing takes into account that considerable differences exist in the bright areas recorded by the sensor for vehicles in the vicinity of the own vehicle and vehicles at a great distance. Corresponding differences also result for light areas stemming from headlamps and those stemming from tail lights. The intensity of bright areas caused by headlamps is greater and white, whereas light areas caused by tail lights have a lower intensity and are more red. Furthermore, the image processing takes into account that the device must respond more rapidly for vehicles that are closer to the own vehicle, than for vehicles that are at a greater distance from the own vehicle.

Figure 8:
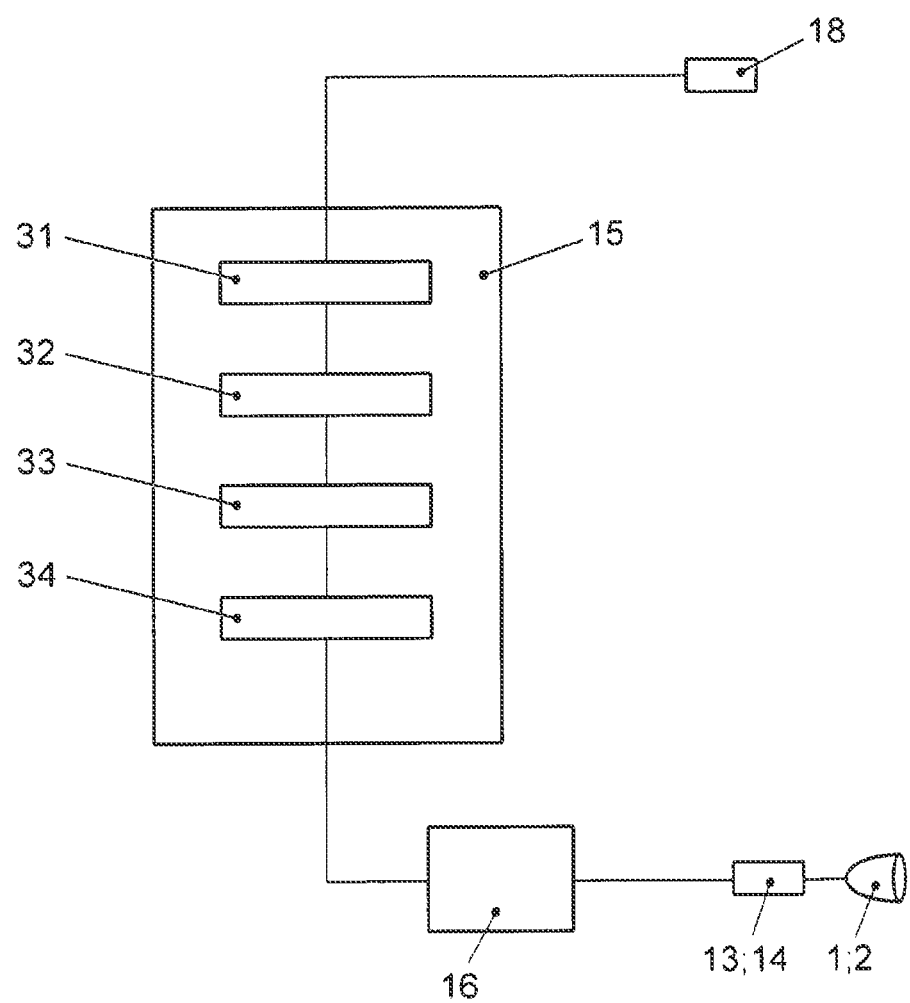
FIG. 8 schematically shows the structure of the device for detecting other road users.
Figure 9:
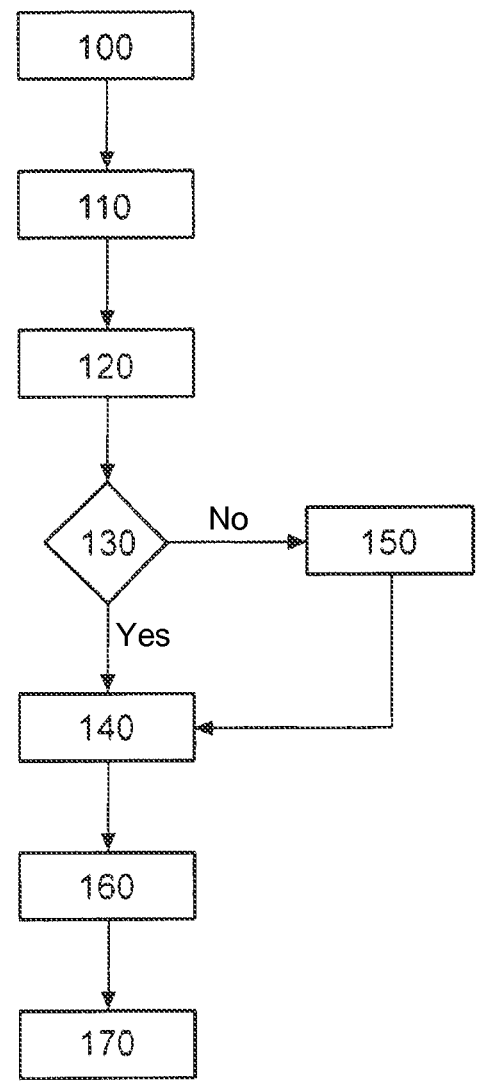
FIG. 9 shows the method steps for detecting other road users, which are executed in the method of an example embodiment of the present invention.

The individual components of image-processing unit 15 and the steps for detecting another road user are described in the following text with reference to FIGS. 8 through 10.

As described above, in step 100, an image of the traffic environment in the visible spectrum in front of own vehicle 10 is first recorded with the aid of the sensor.

In step 110, extraction unit 31 is used for determining which cohesive areas of the image have a brightness that exceeds a specific threshold value. These image areas are extracted. It must then be determined for these image areas whether they are to be assigned to another vehicle or to another object that is not a vehicle. Since the extraction is based on the formation of a simple threshold value, image-processing unit 15 is able to perform it very rapidly, i.e., preferably in real time. The cohesive areas of the image whose brightness exceeds the threshold value are also called blobs.

The following steps 120 through 140 are then executed for each area:

In step 120, the areas are classified by a classifier 32. They are also assigned a classification value. To do so, different characteristics of the area are determined to begin with. Especially important among these characteristics are the maximum gray-scale value of the area and the red component of the area. Furthermore, in particular the following additional potentially useful characteristics of the area are determined in the method and used in the classification: (1) the binary values of the area, especially the surface area, the center of mass, the dimensions, the border and/or the main axes; (2) the intensity or the gray-scale value stemming only from the monochrome pixels, in particular the maximum, the median value, the standard deviation, the position of the maximum within the area, the distribution of the histogram, and/or the magnitude of the medium gradient; (3) the same characteristics, but for red pixels only; and (4) characteristics from which color information is obtainable by different comparisons of monochrome and red pixels, e.g., the ratio between the median value of the monochrome level and the median value of the red level.

Since it is usually impossible to reliably infer a vehicle as the light source based on a single characteristic or based on the afore-described characteristics, the characteristics of the areas are subjected to a learning algorithm. Using the learning algorithm, a classification is ultimately obtained with classification values for the areas and, finally, discrete, weighted classification values for the areas. The Real-AdaBoost algorithm as described in R. Schapire and Y. Singer, "Improved boosting using confidence-rated predictions" in *Machine Learning*, vol. 37, No. 3, pages 297-336, 1999, is used as learning algorithm. Using this learning algorithm, differences in the characteristics of vehicle lights are taken into account in order to subdivide the different areas from the outset: Small areas and areas that are not small have a different appearance; in addition, areas stemming from headlamps differ from those stemming from tail lights. On the basis of this approach, the areas have been subdivided into four basic classes:

$C_{h,s}$: for the detection of oncoming vehicles 11, which are located at a medium to large distance from the own vehicle;

$C_{h,ns}$: for the detection of oncoming vehicles 11, which are situated at distances in the vicinity of the own vehicle, up to a medium distance;

$C_{t,s}$: for the detection of vehicles 12 driving ahead at a medium to large distance;

$C_{t,ns}$: for the detection of vehicles 12 driving ahead, which are located near the own vehicle, up to a medium distance.

According to the axiom that it is better to produce a wrong assignment to a vehicle than to miss a correct assignment, the maximum value of the four output signals of the learning algorithm is chosen, once the areas have been subdivided into the classes.

In step 130, a first decision as to whether or not an area is to be assigned to a vehicle is able to be made already on the basis of this basic classification. If such a rough assignment is possible, the method continues with step 140. If such a rough assignment is not able to be made, the method continues with step 150, which will be discussed later in the text.

Even if the rough assignment to a vehicle is possible in step 130, it has become clear that this rough assignment does not lead to a 100% detection of vehicles. Furthermore, it cannot be ruled out that a reflection of the own light or the light emission of another object is taken for a vehicle light.

For this reason, a confidence value is determined for each area in step 140 by a confidence unit 33, the confidence value constituting a measure for the similarity between the image area and a vehicle light. This confidence value may be calculated from a previously determined classification value of the area and a physical quantity assigned to the area. However, discrete, weighted classification values for the areas are preferably obtained from the classification values by means of the learning algorithm.

The classification value is derived from the afore-described Real-AdaBoost algorithm based on examples from areas that come from vehicular light sources and corresponding contrasting examples. The result is a classification value c; here, positive classification values indicate that an area resembles a vehicle light, and negative classification values point to the opposite. Classification values c are then discretized into corresponding weighted classification values, the weightings being allocated in the following manner:

$$\omega = \begin{cases} \omega_+ & \text{if } c \geq t_+ \text{ applies} \\ \omega_0 & \text{if } t_0 \leq c < t_+ \text{ applies} \\ \omega_- & \text{if } t_- \leq c < t_0 \text{ applies} \\ 0 & \text{if } c < t_- \text{ applies} \end{cases}$$

$t_+$, $t_0$ and $t_-$ being threshold values which are set for each class, and $\omega_+$, $\omega_0$ and $\omega_-$ being corresponding weightings which are defined for each class. Above $t_+$, one can be sure that an area is assignable to a vehicle, and below t, one can be sure that this area cannot be assigned to any vehicle. The range from $t_-$ to $t_+$ is considered an uncertain output of the classification, it being assumed from $t_-$ to $t_0$ that the area more readily resembles a light source that does not belong to another vehicle, whereas in the range from $t_0$ to $t_-$, it is assumed that the areas are more similar to a vehicle light. The following table shows an example for the threshold values that are used:

| In order to obtain no incorrectly classified areas | headlamp classification | | tail light classification | |
|---|---|---|---|---|
| | small | not small | small | not small |
| $(t, \omega)_+$ | (1, 1) | (1, 1'5) | (1, 0'5) | (1, 1) |
| $(t, \omega)_0$ | (0, 0'5) | (0, 1) | (0, 0'25) | (0, 0'25) |
| $(t, \omega)_-$ | (−2, 0) | (−2, 0) | (−2, 0) | (−2, 0) |
| correctly classified (vehicles/no vehicles) | 78%/75% | 97%/97% | 60%/65% | 94%/93% |
| no definite decision (vehicle/no vehicle) | 22%/25% | 3%/3% | 40%/35% | 6%/7% |

At these threshold values for the above equation, no areas result that are classified incorrectly. In addition, the correct classification for areas that are not small is above 90%.

Next, a confidence value v is calculated for each area based on the weighted classification values. If it is assumed that g is the maximum gray-scale value of a given area, normalized across the maximally possible gray-scale value for an area, the confidence value is defined in the following manner:

$$v = \omega \times g,$$

$\omega$ being the weighted classification value assigned to the area. The confidence value thus is obtained from the certainty in the classification multiplied by the certainty of a physical quantity, in this case, the maximum gray-scale value of the area, in particular the maximum gray-scale value of a given area, normalized across the maximally possible gray-scale value. The maximum gray-scale value therefore influences both the weighted classification value and the physical quantity. However, when obtaining the weighted classification values, threshold values learned by an algorithm via different characteristics of the gray-scale value are used, whereas the calculation of the physical quantity uses the gray-scale value directly.

In the afore-mentioned calculation of the confidence value it is taken into account that vehicles which are closer to the own vehicle generate brighter areas in the image recorded by the sensor than vehicles that are at a greater distance. As a result, areas classified as belonging to a vehicle, i.e., to a vehicle in the vicinity of the own vehicle, will have a higher confidence value. If a vehicle is farther away, then the associated area of the image of the sensor may indeed have a high confidence value, but it will be a lower value than that of the area assigned to a closer vehicle. A bright region caused by a reflection is going to have a lower confidence value if classified correctly, and this confidence value will be even lower for areas that are caused by reflections stemming from objects at a large distance.

If the result of step 130 shows that it is impossible to establish the basic classification for a vehicle, then additional information will be utilized for the classification in step 150. Especially the environment of the area can be examined for this purpose. In this examination it may be determined whether another area appears in the vicinity of an area, so that the two areas are assignable to two headlamps or tail lights of another vehicle. In particular, such an examination of the environment may be undertaken for areas for which the result in the basic classification in step 120 had been that $t_- \leq c \leq t_+$, S, for example. If the environment examination finds a pair of lights, then this is an indication of a twin area caused by the right and left headlamp or the right and left tail light of a vehicle. Of course, this examination will have a positive result only for vehicles having two headlamps or tail lights, and not for motor cycles and similar vehicles.

When examining the environment, a window of a size that is proportional to the outline of the area is placed in the left and right side of the area for each area. On the left and right side within each window, a search is conducted for other areas whose center of mass lies within one of the windows. In the event that such a potential twin area has been found, a few of the afore-described characteristics are compared to each other. Each comparison includes the calculation of a ratio, e.g., the ratio of the maximum gray-scale value of the two areas. These ratios form a set of characteristics, which is able to be linked to other characteristics, such as the distance of the centers of mass, the absolute value of the maximum gray-scale value, etc. These values form a set of characteristics, which is used for the afore-described Real-AdaBoost algorithm for the classification. The new classification result of the learning algorithm is utilized for modifying weighted classification value $\omega$ obtained in the afore-described classification. The following rule is used for this purpose: If a negative value (no twin areas) results from the pairing classification, then weighted classification value $\omega$ will not be modified; otherwise, this weighted classification value is set to a higher value, i.e., $\omega_-$ becomes $\omega_0$ or $\omega_0$ becomes $\omega_+$. These weighted classification values are then used as the basis in the further method steps.

Once the confidence values for the areas have been determined in step 140, the temporal coherence of the confidence values is determined in step 160, for which purpose a temporal coherence analysis is performed. It is pointed out that the confidence values for the subsequent temporal coherence analysis may also be obtained in a manner that differs from the one described above. On the other hand, the temporal coherence analysis may also be omitted if the weighted confidence values have been determined as described above.

One possibility for a coherence analysis is based on target tracking, i.e., tracking of the temporal change of the areas in the image recorded by the sensor. Such target tracking is optionally carried out. However, it is difficult to implement and not without errors. For that reason, a coherence analysis that does not require target tracking is performed.

In the temporal coherence analysis, an accumulation field A is formed in order to determine whether the assigned confidence values are temporally coherent. Accumulation field A has the same dimensions as the original image. When updating the accumulation field, the following steps are executed:

1. The values of accumulation field A range from 0 up to a given value $M_A$, beginning with A=0.
2. When a new image k has been obtained:
   (a) A is reduced. A decay of the accumulation is implemented by the arithmetic step A=max(0, A-d), where d is a fixed number which defines the decay component. If one begins with $M_A$, then $M_A/d$ steps are required to obtain 0. It is possible that d assumes different values from two possibilities in different cells of accumulation field A and by a hysteresis method.
   (b) Spread of A. The values of each cell are spread according to the expected movement of the targets in order to combine confidence values that stem from the same target from image to image.
   (c) Increase of A. Assuming that $A_i^{(k)}$ is a coordinate set which forms area i detected in current image k, and $v_i^{(k)}$ is the corresponding confidence value, the following updating formula is used: $A_{A_i}^{(k)} = \min(A^{(k-1)}_{A_i} + v_i^{(k)}, M_A)$, $A_{A_i}$ representing the cell of A whose coordinates correspond to $A_i$.

In the spreading step, a type of dilation is implemented, which is similar to the mathematical morphology of the gray-scale values, but whose structuring element differs in different accumulation cells. The difference is caused by the expected movement of the various targets in the image space. Targets in the vicinity of the horizon remain relatively static from image to image, whereas the position of closer targets varies more strongly. Furthermore, oncoming vehicles move faster in the direction of the lower edge of the image, whereas vehicles driving ahead do not exhibit such behavior. Therefore, the accumulation field is used especially for areas which are more similar to those that are caused by headlamps, than those that stem from tail lights, and another field is used for the remaining areas. This other field is selected according to the classification if it had a higher output during the basic classification.

The areas for image k are finally classified as vehicle lights or no vehicle lights in accordance with a hysteresis criterion related to the corresponding positions of the accumulation field. This means that each accumulation field has an assigned status field S of the same dimensions. As illustrated in FIG. 10, the hysteresis is then implemented in the following manner:

If cell $A_{i,j}$ is zero, then the corresponding value of status field $S_{i,j}$ is set to the value INCORRECT. The next decay component for $A_{i,j}$ is $d=d_f$, $d_f$ being a fixed number; if $A_{i,j} \geq M_A/2$, then $S_{i,j}$ is set to the value TRUE and $d=d_t$, where $d_t$ is a fixed value; if $0 < A_{i,j} < M_A/2$, then $S_{i,j}$ remains unchanged, and there will also be no resulting associated decay of $A_{i,j}$.

The logical OR operation is therefore used for $S_{A_i}^{(k)}$ for a given area i with $A_i^{(k)}$ in image k, in order to finally assign the areas to a vehicle or not to assign them to a vehicle.

Figure 10:
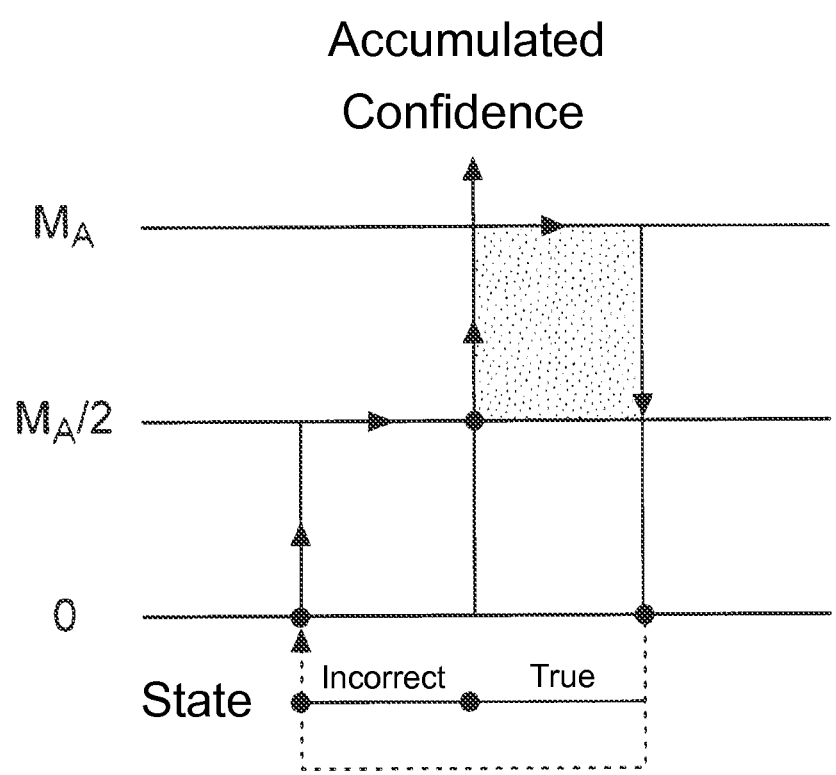
FIG. 10 shows a hysteresis process, which is run through when detecting other road users.

During the temporal coherence analysis, the maximum value for the hysteresis criterion is set to $M_A=2$, so that the hysteresis assigned to a cell of the accumulation field assumes the TRUE state above $M_A/2=1$ and does not reach the status INCORRECT before the zero value has been attained again, as illustrated in FIG. 10. The following values are selected for the decay control: $(d_t, d_f)=(45, 15)$ images, which means that when a vehicle disappears, the system continues to illuminate the new free area for only another approximately two seconds. The same values are selected for the accumulation field of the areas that resemble headlamps and for the areas that resemble tail lights.

As explained, an accumulation field in which the confidence value is summed up for the pixels of the image thus is formed in order to determine the temporal coherence. In a transition from one image to a following image, the confidence value for a pixel is reduced by a fixed value and increased by the confidence value of the corresponding pixel of the following image. In the process, in the transition from one image to a following image, the area may spread as a function of the expected movement of an object assigned to the area. The final decision as to whether an area will be assigned to a vehicle light is made based on the temporal development of the accumulation field, the confidence values of the accumulation field being subjected to a temporal hysteresis. This final assignment is made by assignment unit 34 in step 170.

Figure 11:
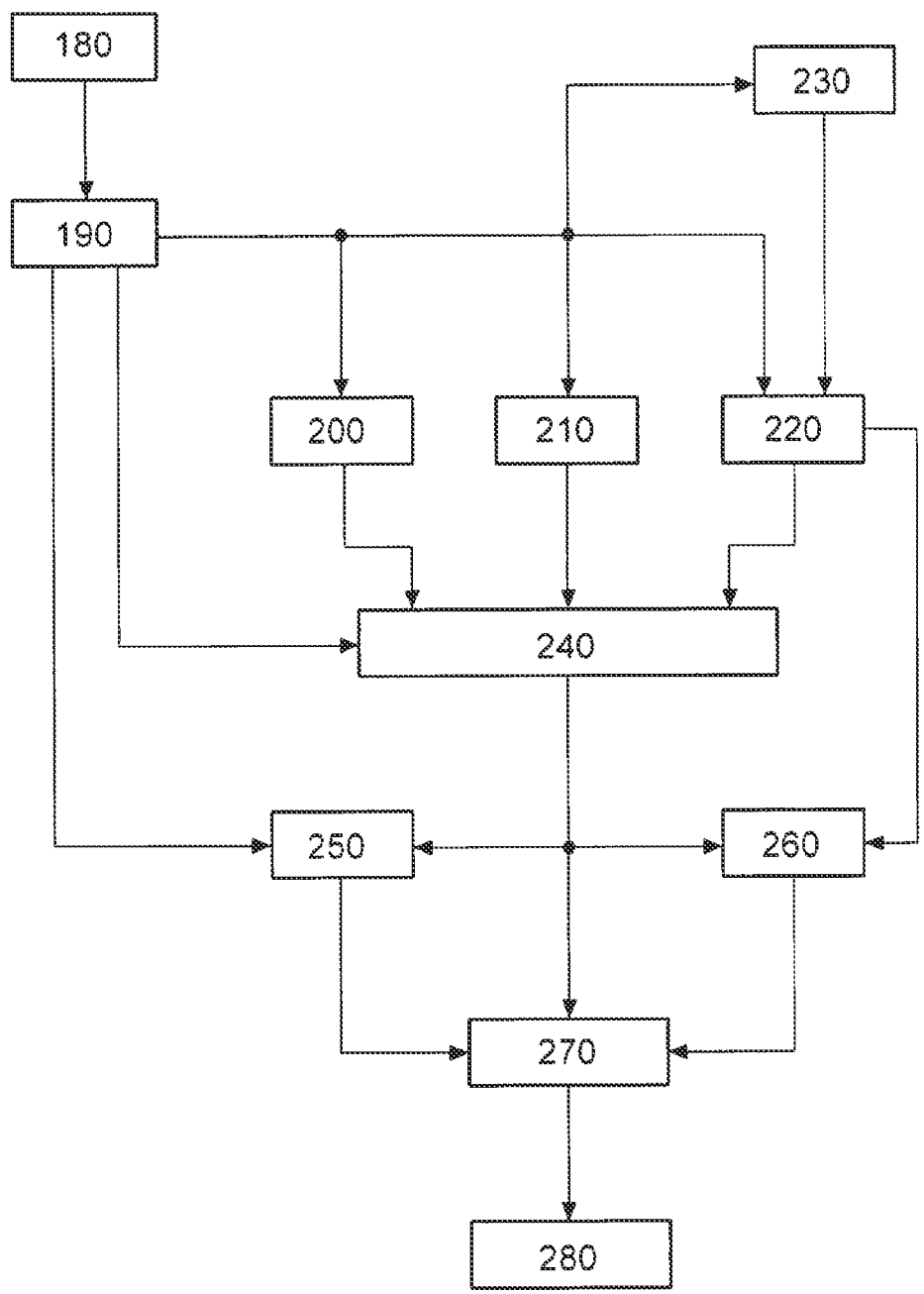
FIG. 11 shows additional possible method steps which are executed when detecting another road user in the method of an example embodiment of the present invention.

A method for detecting other road users will be explained in the following text on the basis of FIG. 11.

A sensor for recording an image of a traffic region in the visible spectrum and an image-processing device 15 are utilized. The detection of the road users, e.g., the vehicles, takes place on the basis of the vehicle lights, i.e., based on the light emission of the front headlamps in the case of oncoming vehicles 11 and based on the light emission of the tail lights for preceding vehicles 12.

In step 180, similar to step 100, an image of the traffic area in front of own vehicle 10 is recorded. In step 190, similar to step 110, cohesive areas having a brightness that exceeds a threshold value are extracted. Thus, a search takes place for cohesive bright pixels in the image produced by the sensor, that have a predefined intensity and possibly exceed a specified magnitude in addition. Such image areas may belong to light sources of another vehicle, but also to other light sources or reflections of the light emission of the own vehicle. The result obtained from step 190 is a binary image, in which cohesive areas having bright pixels are defined by a border. Furthermore, characteristics such as the size, the brightness, color etc. are determined for the areas. If the analysis of an individual image shows that an area is most likely assignable to a vehicle light, then the method may continue directly with step 250 for these particular areas. Furthermore, it is possible to classify the areas based on the characteristics of the areas in step 240. Finally, still further information may be obtained in connection with the areas, as will be described in the following text:

In step 200, an environment analysis of the areas is performed for each area. This environment analysis, for example, may include the pair formation based on twin areas described in the first development, in which two bright areas are assigned to a headlamp pair or a tail light pair in each case. The result of the environment analysis in step 200 is processed further in a step 240.

Another optional processing step concerns the tracking of one or multiple area(s) in an image sequence and determining the movement of the area(s). To make it easier to find an area in the image sequence again, a global movement estimate is implemented for this purpose in step 230. The own movement of vehicle 10 is calculated and taken into account when tracking the areas. In step 230, the global movement is able to be determined based on the correlation of the movement of multiple objects in the image. However, it may also be determined via values that are made available by the odometer system in the vehicle, or by other sensors in the vehicle such as acceleration sensors, for example. A combination of both approaches is possible as well. Image-processing unit 15 is linkable to vehicle bus 17 for this purpose, for instance via control unit 16. Taking the global movement of the vehicle determined in step 230 into account, the movement of the individual areas in the image sequence is determined in step 220.

If image-processing unit 15 tracks the areas across a plurality of images, it is moreover possible in step 210 to stabilize the internal characteristics of the areas that may fluctuate slightly from image to image, across a plurality of images. For this purpose, the characteristics of the areas are averaged over time across a plurality of images in step 210. This method step is especially advantageous for determining the color of a very small area. In the case of a small image area, the light impinges on only very few pixels of the sensor. In a color image sensor, the individual pixels are sensitive to only one color, usually to red, green or blue. A color determination is possible only if the area impinges on a sufficient number of pixels of all color components. If the size of the area is insufficient, then the pixels of the area determined for a plurality of consecutive images may be utilized for this purpose in step 210.

The data obtained in steps 190, 200, 210 and/or 220 are processed further in step 240. As described above, the areas are classified as a function of their size as well as the additional characteristics obtained in the preceding steps; furthermore, a confidence value, especially the weighted confidence value, is determined for the areas, as described previously. The higher the confidence value, the higher the probability that the area may be assigned to a vehicle light, i.e., the headlamp of an oncoming vehicle 11, or the tail light of a preceding vehicle 12.

If the monitoring of an area in an image is insufficient for an unequivocal classification, the confidence value is added up for each area across a plurality of images in step 260. The movement of each area, determined in step 220, is taken into account. If an area is able to be monitored across a plurality of images, a new confidence value is determined by summing up or reducing the confidence values of the area.

In parallel or alternatively, the confidence value for each pixel is able to be added up or reduced. This does not require tracking of the areas. In step 250, the image areas, i.e., the pixels within the border of a specific area that has been determined by the afore-mentioned steps, are provided with the confidence value of this area. In a subsequent image, a specific value, as explained above, is automatically deducted from the confidence value of the area, so that the confidence value drops to zero over time in areas which no longer include any bright areas in the following images. At the same time, the accumulated confidence of the area lying underneath is added to the confidence value of an area for each subsequent image. This results in a new confidence value, which not only contains the current confidence of the area, but, via two-dimensional accumulation, also the confidences of areas in this image area that occurred just previously. Furthermore, in step 250, this two-dimensional confidence field of an area may be enlarged from image to image in the decay. The propagation direction in the enlargement of this confidence field is adaptable to the expected object movement or to the expected movement of own vehicle 10. This ensures that, despite the movement of an area, the area is still based on confidence values that were generated by the same area in the preceding image.

If the classification generated in step 240 ultimately produces a confidence value that allows an unequivocal decision as to whether or not a particular region is assignable to a vehicle light, then the result of step 240 may also be processed further directly. The confidence values determined in this manner in steps 240, 250 and 260 are combined in step 270, and a final decision is made as to whether this area is a relevant object, i.e., whether the brightness in this area comes from a light source of another vehicle, or whether this is not the case.

Finally, in step 280, areas that are able to be assigned to other vehicles 11, 12 are output together with the appropriate coordinates in relation to own vehicle 10. Especially the angular positions of the detected preceding or oncoming vehicles 11, 12 relative to own vehicle 10 result from these coordinates.

It is pointed out that steps 200, 210 and 220 may also be omitted altogether as a function of the result of step 190; it is also possible that only a single step or individual ones of these steps is/are executed. In addition, steps 250 and 260 may be executed in parallel or as an alternative. Finally, they may also be completely omitted depending on the result of step 240.

Ultimately, it is possible to utilize the hysteresis, which has been explained above. If a confidence value is exceeded, then the area is classified as a relevant object. If a lower value is not attained, then the area will no longer be classified as relevant object. The accumulation of the confidence values in processing steps 250 and 260, or the accumulation in processing step 210 is cut off at a set maximum value. This ensures that a drop below the lower hysteresis threshold will be achieved again in sufficient time.

Using camera 18, which includes the afore-described sensor, and image-processing unit 15, it is therefore detected whether another road user, in particular an illuminated road user, is located in front of own vehicle 10 in the driving direction. In addition, the position of such a road user in relation to the own vehicle is determined. The data in connection with a detected other road user are transmitted to image-processing unit 15 by control unit 16.

In addition, control unit 16 is connected to a vehicle bus 17, via which additional data detected in the vehicle are able to be transmitted to control unit 16. For instance, geographical data from a navigation system 28 are transmittable to control unit 16 by way of vehicle bus 17. Navigation system 28 is able to determine the current position of vehicle 10 by means of a receiving sensor, which may be implemented as GPS (Global Positioning System) receiver 29, for example.

The headlamp system may furthermore include a device 25 for detecting the driving behavior of vehicle 10. Device 25, for instance, may be coupled to an internal clock and a speedometer of the vehicle via vehicle bus 17, and determine the acceleration of vehicle 10 based on the transmitted speed using the time signal from the internal clock. Via the temporal development of the magnitude of the acceleration or the size of the absolute value of the acceleration, device 25 is able to determine a driving dynamics characteristic and assign it to a specific class for the driving behavior. Furthermore, an input signal of the driver specifying the driving behavior, for instance, may be transmitted to device 25. Finally, device 25 is also able to determine the driving behavior as a function of a driver type. For this purpose device 25 may be coupled to a device for determining the person of the driver, via vehicle bus 17. Historical data in connection with this driver is storable in device 25, so that device 25 is able to assign a particular driver type, which determines the driving behavior, to the current driver. The driving behavior determined by device 25 is transmitted to a timer 27. Timer 27 determines a time interval $\Delta T$ for the transition from one total light pattern to another total light pattern, as a function of the determined driving behavior. Timer 27 transmits determined time interval $\Delta T$ to control unit 16, which processes it further.

In addition, control unit 16 is connected to a delay unit 26. Delay unit 26 determines a delay time by which a switchover between two total light patterns or between two illumination states for the illumination range is delayed. The manner in which the delay time is determined by delay unit 26 will be described in greater detail at a later point.

In the following text, it is described in which manner the afore-described headlamp system is controlled or regulated.

Figure 12:
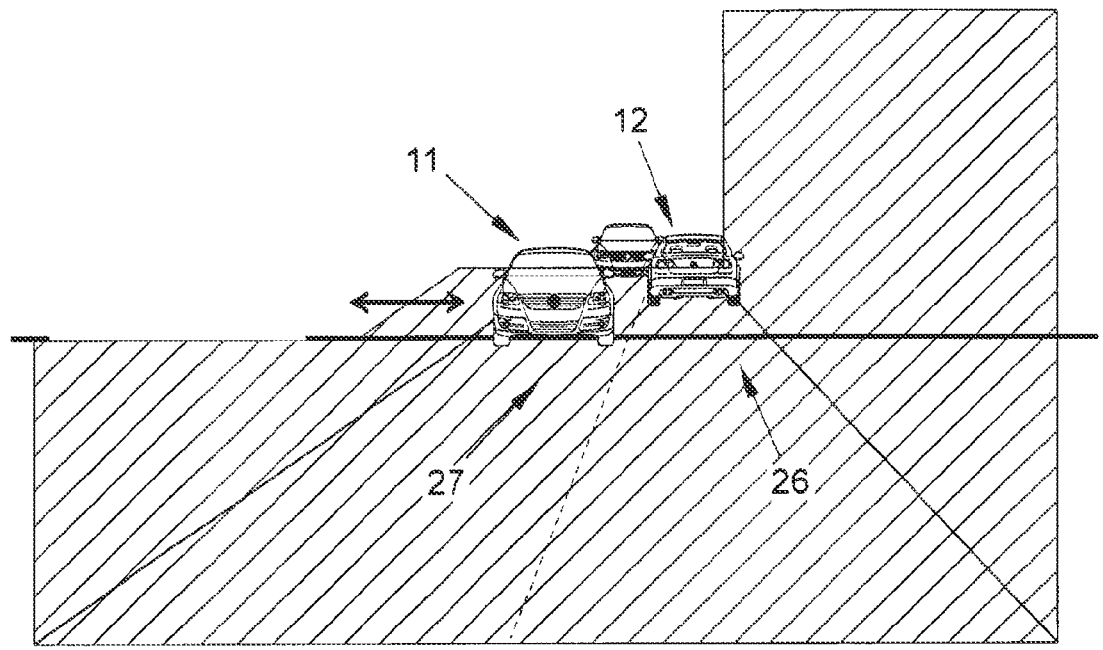
FIG. 12 shows a light pattern in a conventional method in the switchover from the first total light pattern to the second total light pattern.
Figure 13:
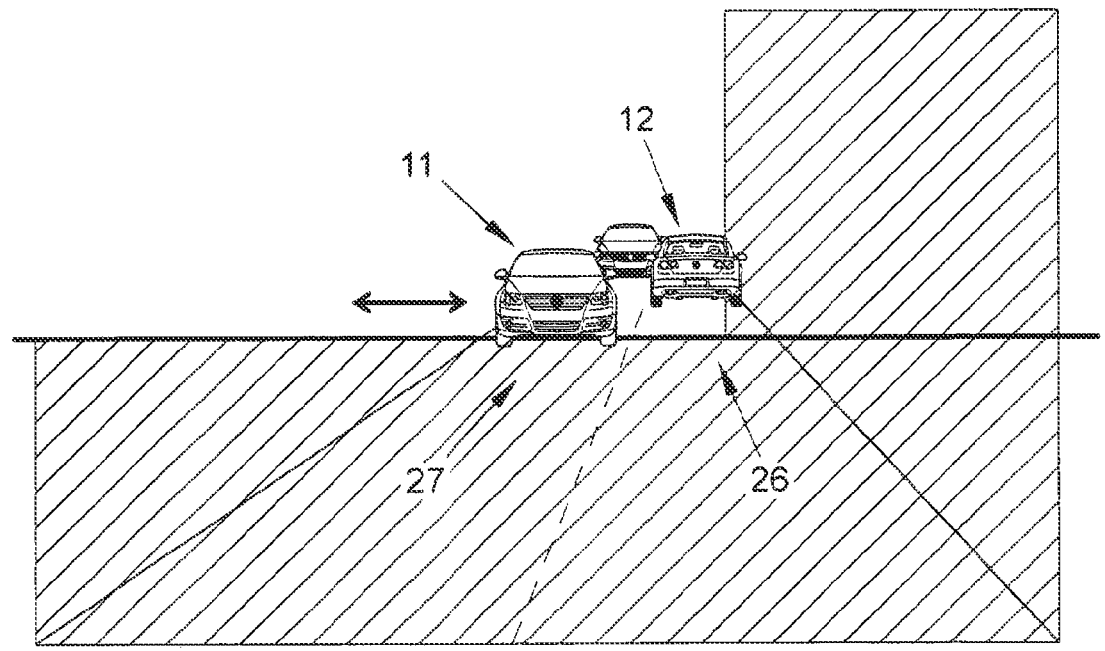
FIG. 13 shows the light pattern when pivoting from the first total light pattern to the second total light pattern according to the method of an example embodiment of the present invention.

The manner in which a switch takes place from first total light pattern 39 to second total light pattern 40 will be described with reference to FIGS. 12 and 13. Vehicle 10 is traveling on a single lane 26, for example. The headlamp system of vehicle 10 produces first total light pattern 39. The presence of other detected road users 11 and 12 causes a control signal to be transmitted to control unit 16 using camera 18 and image-processing unit 15, to the effect that a switch should take place from first total light pattern 39 to the masked permanent high beam of second total light pattern 40.

In the transition from first total light pattern 39 to second total light pattern 40, control unit 14 of left headlamp 2 controls actuator 23 such that light emission direction L of second headlamp 2 is pivoted horizontally toward the outside in the direction of the oncoming lane, away from light emission direction L of first headlamp 1. Since in first total light pattern 39, the greater illumination range in the right region of total light pattern 39 is also produced by the light emission of second, left headlamp 2, among others, the problem arises that other road users 11 and 12 would be blinded when left headlamp 2 is pivoted about vertical axis 38. This situation is schematically illustrated in FIG. 12.

To avoid such blinding of other road users 11 and 12 during the switchover from first total light pattern 39 to second total light pattern 40, the method initially reduces the illumination range of left headlamp 2 (in right-hand traffic) on the right side of center axis 36 between lanes 26 and 27, at least to such an extent that it is less than the distance to a detected road user 11 or 12. Only then will second total light pattern 40 be produced by increasing the illumination range in the left side region adjacent to detected road users 11 and 12, so that a corridor is created which has a lower illumination range for one of the road users 11 or 12 or for both road users 11 and 12. FIG. 13 illustrates the switchover from first total light pattern 39 to second total light pattern 40. It should be understood that other road users are not blinded during the switchover either.

A corresponding approach is used if the reverse takes place, i.e. a switch from second total light pattern 40 back to first total light pattern 39, in that initially, a left side region $S_2$ of second total light pattern 40 is blanked out, so that the illumination range in this region corresponds to the illumination range in center region M; left headlamp 2 is then pivoted about vertical axis 38, back into the position for first total light pattern 39, and only then will the asymmetrical light pattern that is characteristic of first total light pattern 39 be produced by left headlamp 2 as well.

If a so-called city-light functionality is able to be produced by the headlamp system, in which the asymmetry of first light pattern 39 is canceled and a maximum illumination range is provided, which is so low that other road users are not blinded, it is also possible to first switch to the city-light functionality in the switchover from first total light pattern 39 to second total light pattern 40, whereupon left headlamp 2 and possibly also right headlamp 1 is/are pivoted about vertical axis 38 in the outward direction in order to finally produce the masked permanent high beam of second total light pattern 40.

The control of the illumination range in center region M in second total light pattern 40 will be explained with reference to FIGS. 14 and 15. In this case, in contrast to the example shown in FIG. 10, a corridor having reduced illumination range 43 is formed in second total light pattern 40, in a center region M in which both a preceding vehicle 12 and oncoming vehicles 11a, 11b are situated. A second total light pattern 40 adapted in this manner is able to be produced by a control signal from image-processing unit 15 in the event that increased traffic density is encountered, in which case a permanent control of the illumination range in left side region S2 would be disadvantageous.

Figure 14:
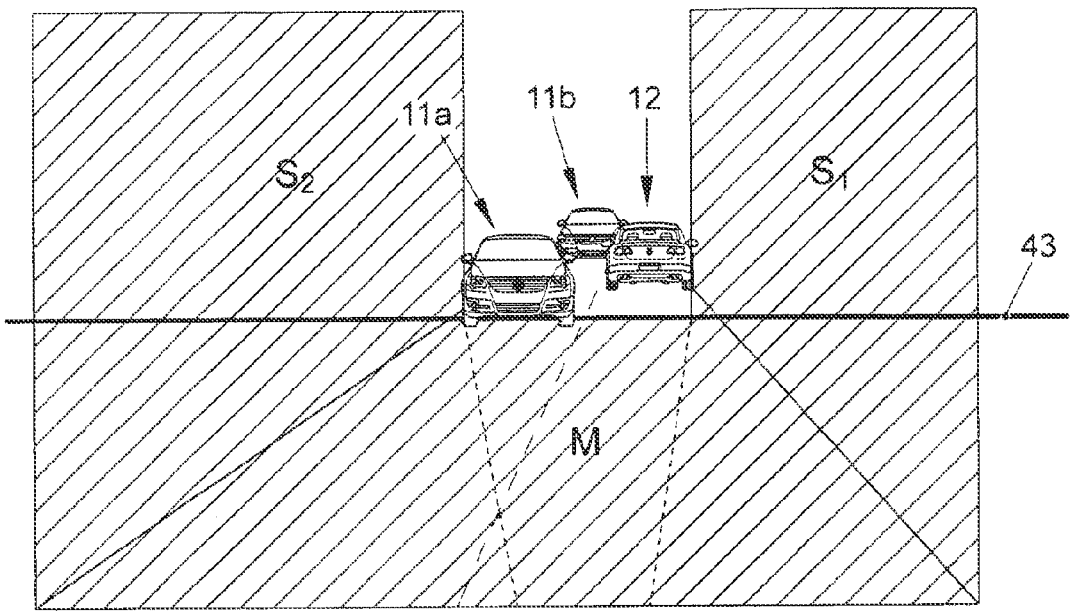
FIG. 14 shows an example of the second total light pattern.
Figure 15:
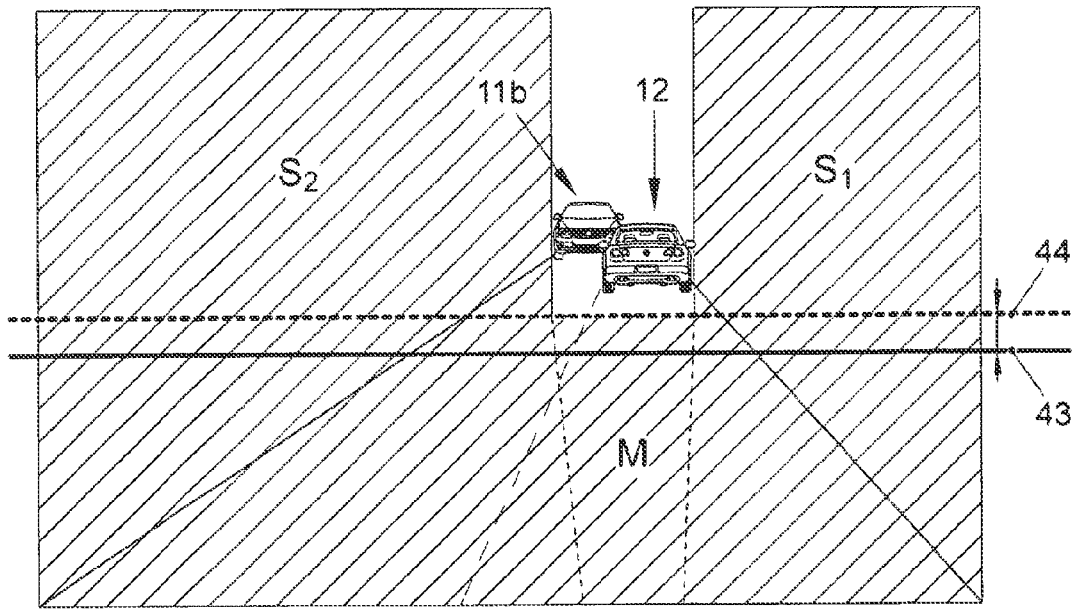
FIG. 15 shows the change in the illumination range in the center region of the second total light pattern according to the method of an example embodiment of the present invention.

Side regions $S_1$ and $S_2$ of adapted total second light pattern 40 shown in FIGS. 14 and 15 are produced, for instance, by pivoting the two headlamps 1 and 2 about vertical axis 38 in their light emission direction L, farther away from each other. The inner vertical light-dark cutoffs in the corridor for vehicles 11 and 12 are produced by shifting diaphragms 8 and 9 with the aid of actuators 21 and 24. However, the horizontal light-dark cutoff in center region M, i.e., illumination range 43 in this center region M, is produced exclusively by the illumination range control, in that headlamps 1 and 2 are pivoted about horizontal axis 37 by actuators 19 and 22. The control is implemented such that light-dark cutoff 43 is adapted to the distance to detected road users 11 and 12. For example, starting from the traffic situation shown in FIG. 14, if oncoming vehicle 11a has passed by, the illumination range to preceding vehicle 12 is adjusted to value 44 shown in FIG. 15. This type of control of illumination range 43 in center region M of the second total light pattern is also especially advantageous when driving uphill and downhill.

FIGS. 16 through 19 show a further refinement of the control of second total light pattern 40. Similar to the example discussed with reference to FIGS. 12 and 13, the illumination range in center region M is controlled such that it extends to next detected road user 11, 12. The opening angle for center region M thus is selected in such a way that it detects the direction of all detected road users 11 and 12 in front of own vehicle 10 in the driving direction. On the right side, adjacent to center region M, a side region $S_1$ having a greater illumination range is formed. A second side region $S_2$ having an increased illumination range is also formed on the left side adjacent to center region M.

Figure 16:
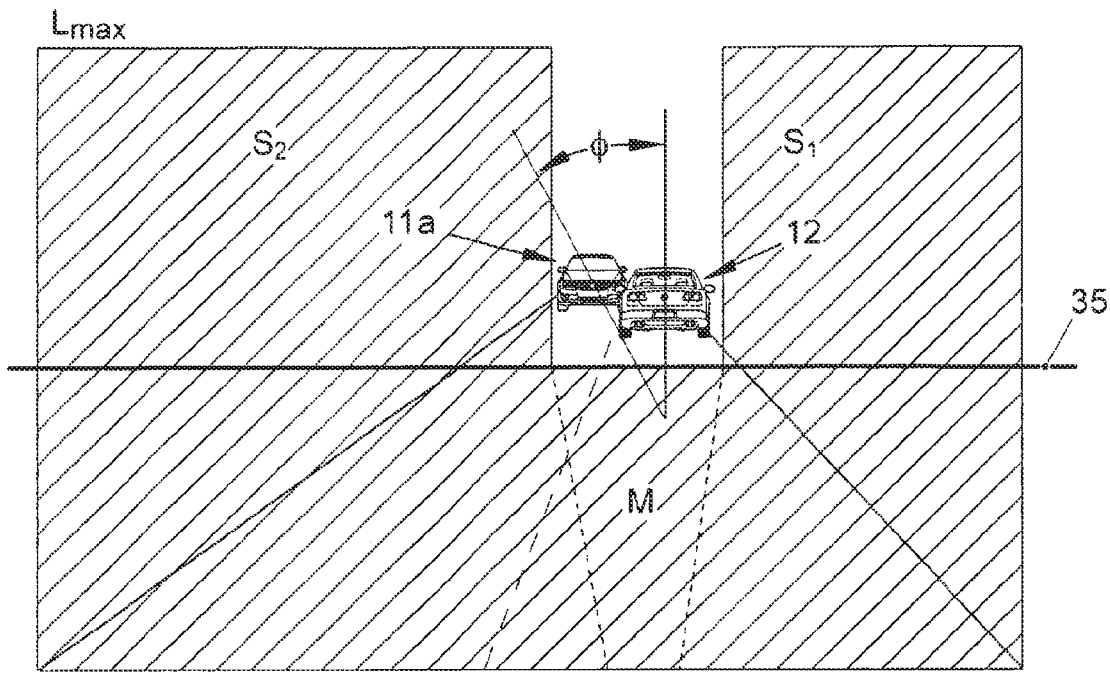
FIGS. 16 and 17 show the change in the second total light pattern in the left lateral region when an oncoming vehicle appears.
Figure 17:
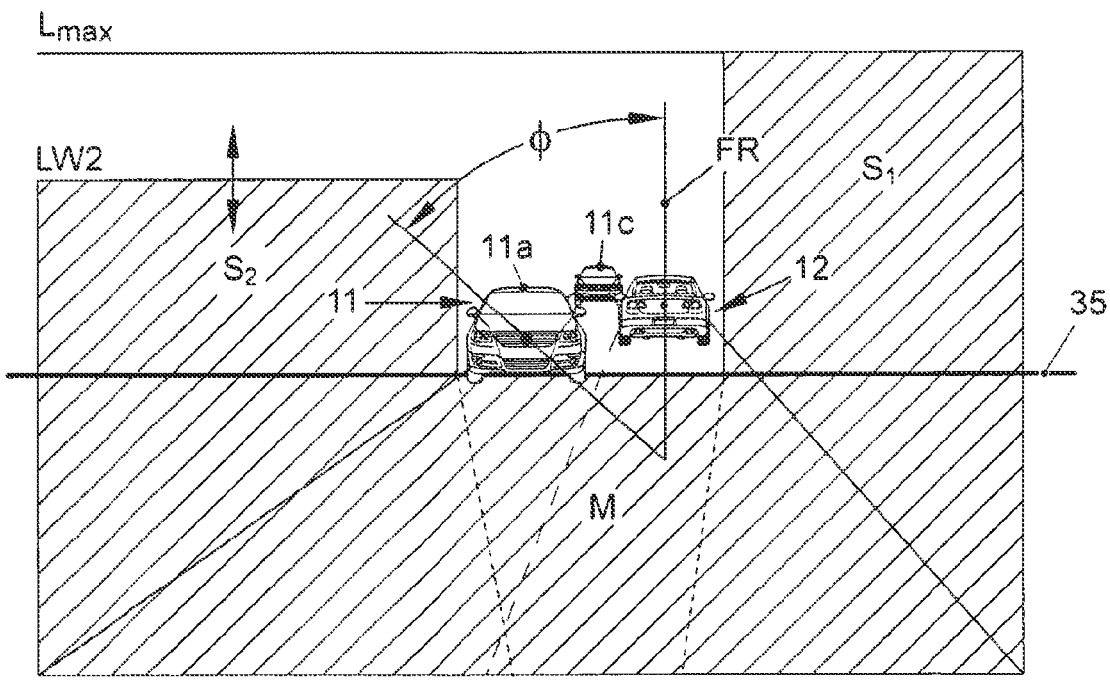

In the situation shown in FIG. 16, in which a preceding vehicle 12 and an oncoming vehicle 11a have been detected, the illumination range in left side region $S_2$ is at a maximum, i.e., $L_{max}$. If oncoming vehicle 11a continues to approach vehicle 10 having the headlamp system, the problem arises that the driver of vehicle 11a would be blinded by left side region $S_2$ if center region M were formed using the smallest opening angle possible. If oncoming vehicle 11a comes closer to own vehicle 10, the opening angle for center region M becomes larger. However, when an oncoming vehicle 11a reaches the left vertical light-dark cutoff to side region $S_2$, left side region $S_2$ must be switched off, i.e., the illumination range of left side region $S_2$ must be lowered to the illumination range of center region M in order not to blind passing vehicle 11a. The closer vehicle 11a is to own vehicle 10, the higher the speed at which the illumination range of left side region $S_2$ must be lowered to avoid the blinding, since the relative angular velocity of passing vehicle 11a becomes very high and thus very little time remains for lowering the illumination range in left side region $S_2$.

In order to avoid the danger of blinding a passing vehicle 11a, the method controls illumination range $LW_2$ in the direction of left side region $S_2$ of the second total light pattern as a function of horizontal angle ϕ between driving direction FR of vehicle 10 and the connecting line from vehicle 10 to oncoming vehicle 11a. Illumination range $LW_2$ in left side region $S_2$ of second total light pattern 40 is lowered early enough to avoid an abrupt change in second total light pattern 40 when an oncoming vehicle 11a passes own vehicle 10. The illumination range of right side region $S_1$ may remain unchanged in such a case. The inner vertical light-dark cutoff of second side region $S_2$ is controlled as a function of the position of preceding vehicle 12 in this case.

Figure 18:
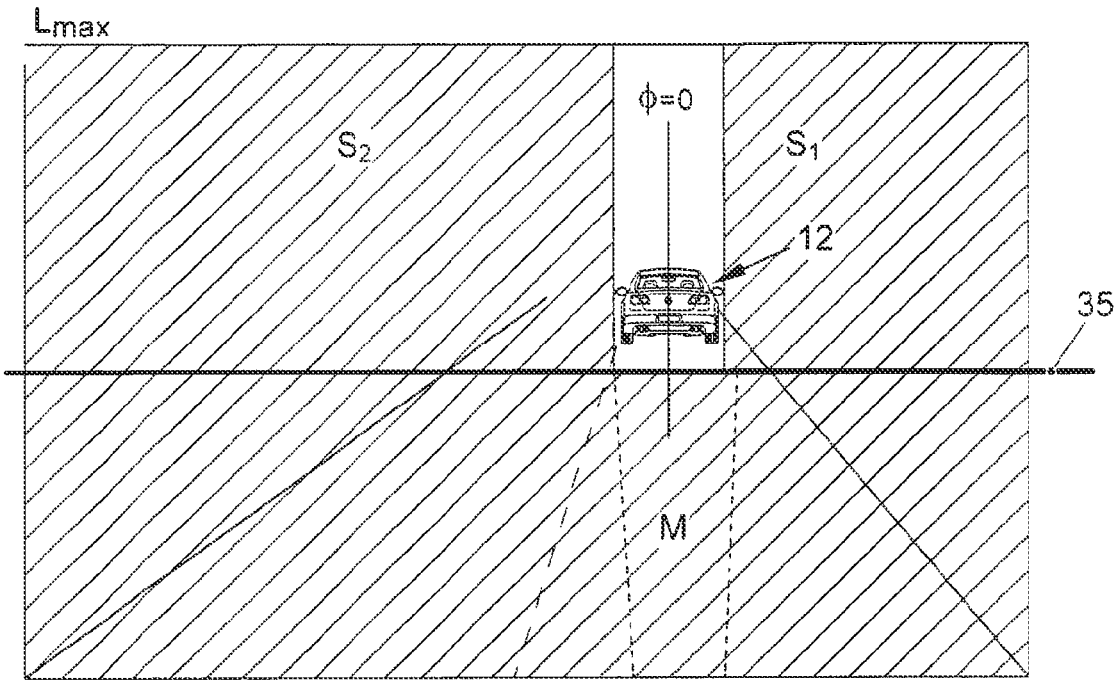
FIGS. 18 and 19 show the change in the right lateral region of the second total light pattern during a passing maneuver according to the method of an example embodiment of the present invention.
Figure 19:
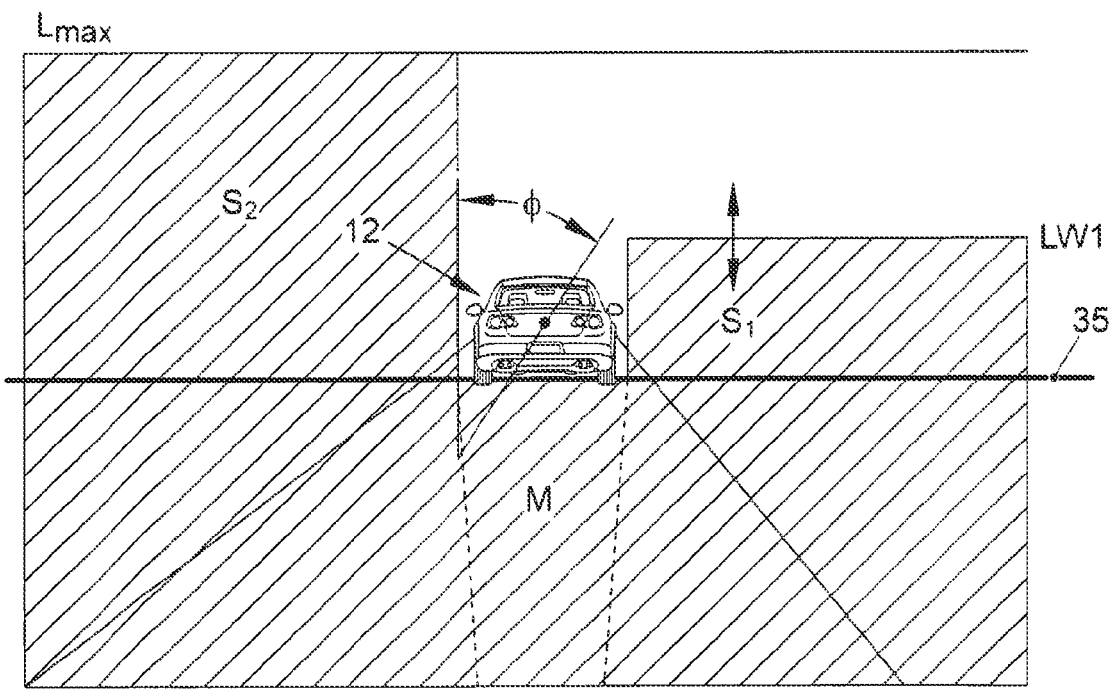

The control of the second total light pattern during a passing maneuver is illustrated with reference to FIGS. 18 and 19. In front of own vehicle 10 is a preceding vehicle 12, in whose direction the illumination range is less than the distance to preceding vehicle 12. During a passing maneuver, vehicle 10 drives onto the oncoming lane and approaches vehicle 12 driving ahead. In this case, illumination range $LW_1$ in right side region $S_1$ of total light pattern 40 is controlled as a function of horizontal angle ϕ between the driving direction of vehicle 10 and the connecting line from vehicle 10 to preceding vehicle 12. The closer vehicle 10 comes to preceding vehicle 12, the more illumination range $LW_1$ is reduced in right side region 51. The control for reducing right side region may take place automatically on the basis of the data transmitted by image-processing unit 15. However, the control may also be induced by setting the turn signal indicator in the direction of the oncoming lane, possibly in conjunction with data for the acceleration of vehicle 10.

During a passing maneuver, vehicle 10 drives onto the oncoming lane and approaches vehicle 12 driving ahead. In this case, illumination range $LW_1$ in right side region $S_1$ of second total light pattern 40 is controlled as a function of horizontal angle ϕ between the driving direction of vehicle 10 and the connecting line from vehicle 10 to preceding vehicle 12. The closer vehicle 10 comes to preceding vehicle 12, the more illumination range $LW_1$ is reduced in right side region S1. The control for reducing right side region may take place automatically on the basis of the data transmitted by image-processing unit 15. However, the control may also be induced by setting the turn signal indicator in the direction of the oncoming lane, possibly in conjunction with data for the acceleration of vehicle 10.

Figure 20:
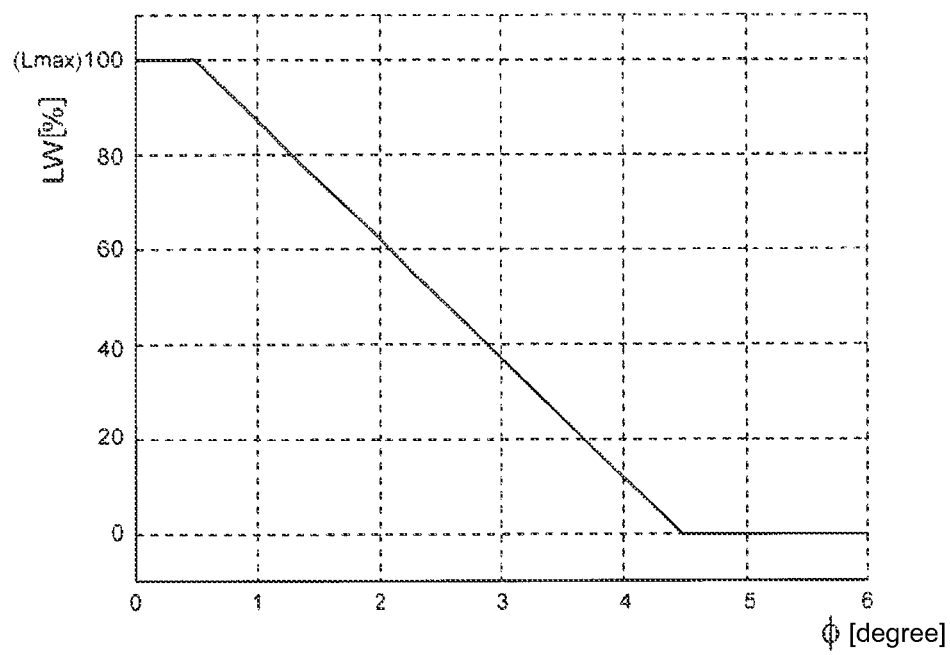
FIG. 20 shows a diagram, from which the illumination range in a lateral region for the second total light pattern results as a function of the horizontal angle relative to a detected road user according to the method of an example embodiment of the present invention.

FIG. 20 shows an example for a functional correlation between illumination range LW, i.e., $LW_1$ and $LW_2$, and horizontal angle ϕ to another road user 11 and 12, respectively. In this example, horizontal angle ϕ is positive both in the direction of an oncoming vehicle 11 and in the direction of a preceding vehicle 12 being passed. Up to an angle of 0.5 degrees, illumination range LW in side region $S_1$ or $S_2$ is at a maximum, i.e., it corresponds to illumination range $L_{max}$. At larger horizontal angles ϕ, illumination range LW is reduced in linear fashion, until it assumes a minimum value starting at 4.5 degrees, at which other road users are no longer blinded. In this context, the illumination range is determined as follows:

$LW=L_{max}$ for ϕ<0.5 Grad $LW=L_{max}(-0.25 \cdot \Phi+1.125)$ for 0.5 Grad≤Φ≤4.5 Grad, $LW=0$ for Φ>4.5 Grad The increase in the curve illustrated in FIG. 20 may also be varied. For example, it may be increased up to $0.4^{-1}$ degrees or lowered down to $0.167^{-1}$ degrees. The limit angles for the decrease in the illumination range and the achievement of the minimum illumination range may also be varied in this case.

As described above, it is also possible that the time interval for the transition from one total light pattern to another total light pattern is specified by control unit 16. This time interval is transmitted from control unit 16 to timer 27. The time interval, in particular, defines a switchover from first total light pattern 39 or from third total light pattern 41 to second total light pattern 40.

Figure 21:
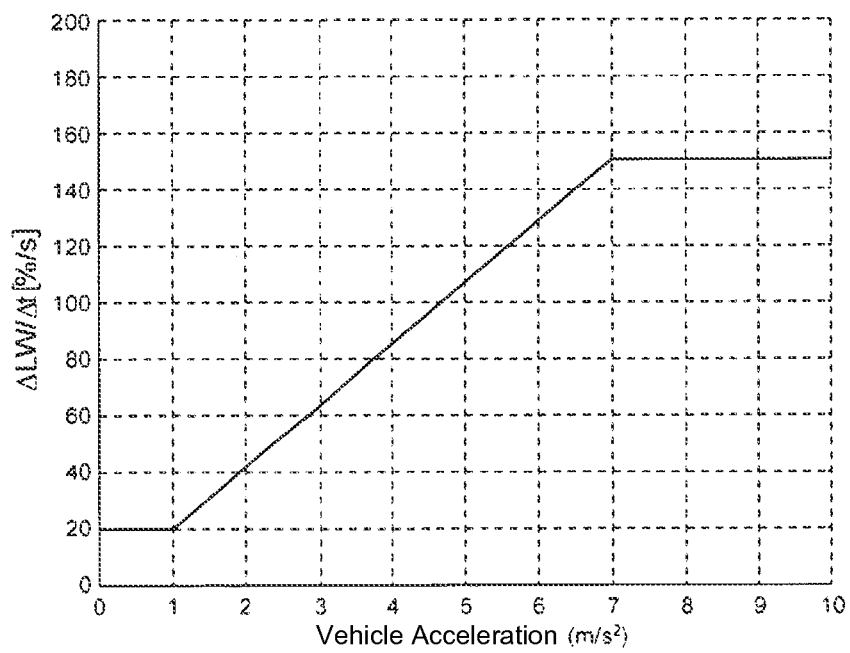
FIG. 21 shows a diagram for illustrating the switchover time in the switchover from the first total light pattern to the second total light pattern according to the method of an example embodiment of the present invention.

FIG. 21 shows a diagram which represents, as a %/s unit, the change in illumination range ΔLW/per time unit as a function of the vehicle acceleration. In this case, 0% means that illumination range LW corresponds to the illumination range of a low beam, and 100% corresponds to the illumination range of a high beam functionality. A 100% change per second in the illumination range thus causes a time interval ΔT of one second for the switch from one illumination range for a low beam functionality, to an illumination range for a masked permanent high beam. Accordingly, a change of 20%/per second in the illumination range means a time interval ΔT of five seconds until the masked permanent high beam has been activated completely.

The change in illumination range ΔLW, and thus time interval ΔT for the switch from one total light pattern to another total light pattern, is able to be calculated from acceleration B in the following manner:

$$\Delta LW = B \cdot k_3$$

where $k_3$ $$10 \frac{\% \cdot s}{m} \le k_3 \le 200 \frac{\% \cdot s}{m}$$

in particular, $$40 \frac{\% \cdot s}{m} \le k_3 \le 80 \frac{\% \cdot s}{m}$$

and where preferably $$k_3 = 50 \frac{\% \cdot s}{m}$$

and where $$20 \frac{\%}{s} \le \Delta LW \le 150 \frac{\%}{s}$$

Figure 22:
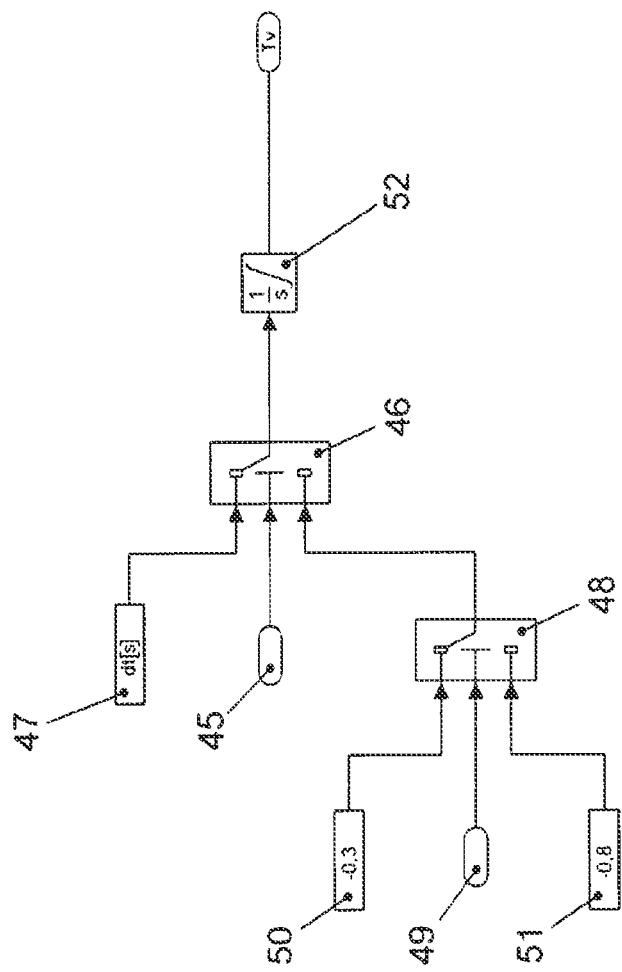
FIG. 22 shows a flow chart for calculating a delay time.

The manner in which delay unit 26 determines a time interval Tv, by which the switchover between two total light patterns or two illumination states of a total light pattern is defined as a function of the detection rate of other road users 11, 12, will be described in the following text with reference to FIG. 22. The data pertaining to the occurrence and positions of other road users 11, 12 are transmitted by image-processing unit 15 to delay unit 26 via control unit 16 and vehicle bus 17. Control unit 16 processes the delay time transmitted by delay unit 26 in such a way that a switchover operation is delayed by this time interval Tv.

The following text describes one example in which delay unit 26 defines a time interval Tv for the delay time for a switchover from first total light pattern 39, i.e., a low beam, for instance, to second total light pattern 40, i.e., a masked permanent high beam, for example. Delay unit 26 is equipped with a signal transmitter 45 for this purpose, which detects a switch from second total light pattern 40 to first total light pattern 39 and outputs a signal to a switch 46 with each switchover. In each switchover from second total light pattern 40 to first total light pattern 39, the signal from signal transmitter 45 operates switch 46 such that a positive time value, which is generated by a time incrementer 47, is applied at its first input. In such a switch, for instance, a time value of 7 seconds may be applied at the first input of switch 46, which then forwards this value to its output.

Following a signal from signal transmitter 45 and the one-time transmission of the time value of time incrementer 47, switch 46 switches to a second input, which is connected to the output of a further switch 48. Switch 48 is connected to an additional signal transmitter 49. Signal transmitter 49 detects whether first total light pattern 39 is active. If this is the case, it switches the first input of switch 48 to the output of a first time transmitter 50 for a reduction rate. This first time transmitter 50 continually supplies a certain negative time value per time unit to the first input of switch 48. For instance, timer 50 outputs a reduction rate of $-0.3 \text{ s}^{-1}$ to the first input of switch 48, which forwards this value to the second input of switch 46, via its output.

If signal transmitter 49 detects that first total light pattern 39 is not active, it switches switch 48 to the second input, which is connected to a second timer 51 for the reduction rate. Second timer 51 induces a more rapid reduction of the delay time. For instance, the second timer continually transmits a reduction rate of $-0.8 \text{ s}^{-1}$, to the second input of switch 48, which is forwarded to the second input of switch 46 when first total light pattern 39 is not active.

The time values generated at the output of switch 46 are transmitted to an integrator 52, which adds up the values. However, integrator 52 has a limit for delay time Tv. Delay Tv may lie only in a region between 2 seconds and 200 seconds. Delay time Tv is output by integrator 52, and delay unit 26 transmits this delay time Tv to control unit 16.

It is pointed out that signal transmitter 45 detects a switch from second total light pattern 40 to first total light pattern 39 in particular when another road user, e.g., an oncoming vehicle 11 or a vehicle 12 traveling ahead, has been detected on the adjacent road lane. Delay time Tv thus is dependent on the detection rate of other road users. As an alternative, however, it is also possible that signal transmitter 45 outputs a signal to switch 46 when another road user has been newly detected, regardless of an actual change in the total light pattern. This other, newly detected road user in particular is a preceding vehicle 12 which travels on the adjacent lane and passes own vehicle 10, or it is an oncoming vehicle 11, which leaves the detection range of the camera and drives past the own vehicle.

Delay time Tv may be used not only for a delay in the switch between two total light patterns, but also in the switch between two illumination states of a total light pattern. As described earlier, for instance, second total light pattern 40, i.e., the masked permanent high beam, may have two illumination states. In a first standard illumination state, a corridor is formed for a detected road user or a plurality of detected road users 11, 12, in front of which a center region M having a lower illumination range is formed, and laterally adjacent thereto, side regions $S_1$ and $S_2$ having a greater illumination range (see FIGS. 14 and 15). In another illumination state, for instance, it is possible to dispense with left side region $S_2$ (in right-hand traffic). The same illumination range as in center region M is then provided in this region. In such a case, as discussed with reference to FIGS. 16 and 17, it is not necessary to control the illumination range in the left region as a function of the horizontal angle φ relative to a detected road user. If, for example, signal transmitter 45 detects an oncoming vehicle 11 too frequently in such a case, the illumination range in side region $S_2$ is no longer controlled as a function of horizontal angle φ relative to an oncoming vehicle 11, but the enlargement of the illumination range in region $S_2$ is delayed by time interval Tv, once an oncoming vehicle 11 has driven past own vehicle 10. If new oncoming vehicles 12 have been detected within this time interval Tv, and signal transmitter 45 therefore forwards the time value of time incrementer 47 to integrator 52 as discussed with reference to FIG. 22, the illumination range in side region $S_2$ will remain minimal for a longer period of time instead of being set to a higher value in the meantime.

Control unit 16 furthermore may determine under which conditions a switch between two total light patterns or two illumination states of a total light pattern will take place to begin with. In the decision as to whether a switch will be implemented at all, control unit 16 may consider the statistics of the detected road users and/or the temporal development of the steering angle. This will be described in the following text using the switch between second total light pattern 40 and third total light pattern 41, with reference to FIG. 23.

Image-processing unit 15 transmits a signal to control unit 16 if a new road user such as a new vehicle, for example, has been detected. This signal is transmitted to switch 57 as control signal. Switch 57 then switches through the upper first input shown in FIG. 23, which is connected to the output of logic unit 56. Logic unit 56 has two inputs, via which step sizes are supplied. The first input is used for forwarding a position-dependent step size to logic unit 56. The position of the object transmitted from image-processing unit 15 is forwarded to a position-dependent first step size incrementer 53 for this purpose, which, by a characteristic curve, assigns a step size to the position of the new object and outputs it to logic unit 56. A speed-dependent step size is forwarded to the second input of logic unit 56. Toward this end, speedometer 54 forwards the current vehicle speed to a speed-dependent second step size incrementer 55. Based on a characteristic curve, second step size incrementer 55 determines a step size as a function of the vehicle speed and transmits it to logic unit 56. Logic unit 56 determines the maximum step size that was transmitted via the two inputs, and transmits this maximum step size to first input of switch 57, from where it is forwarded to an integrator 59.

Figure 23:
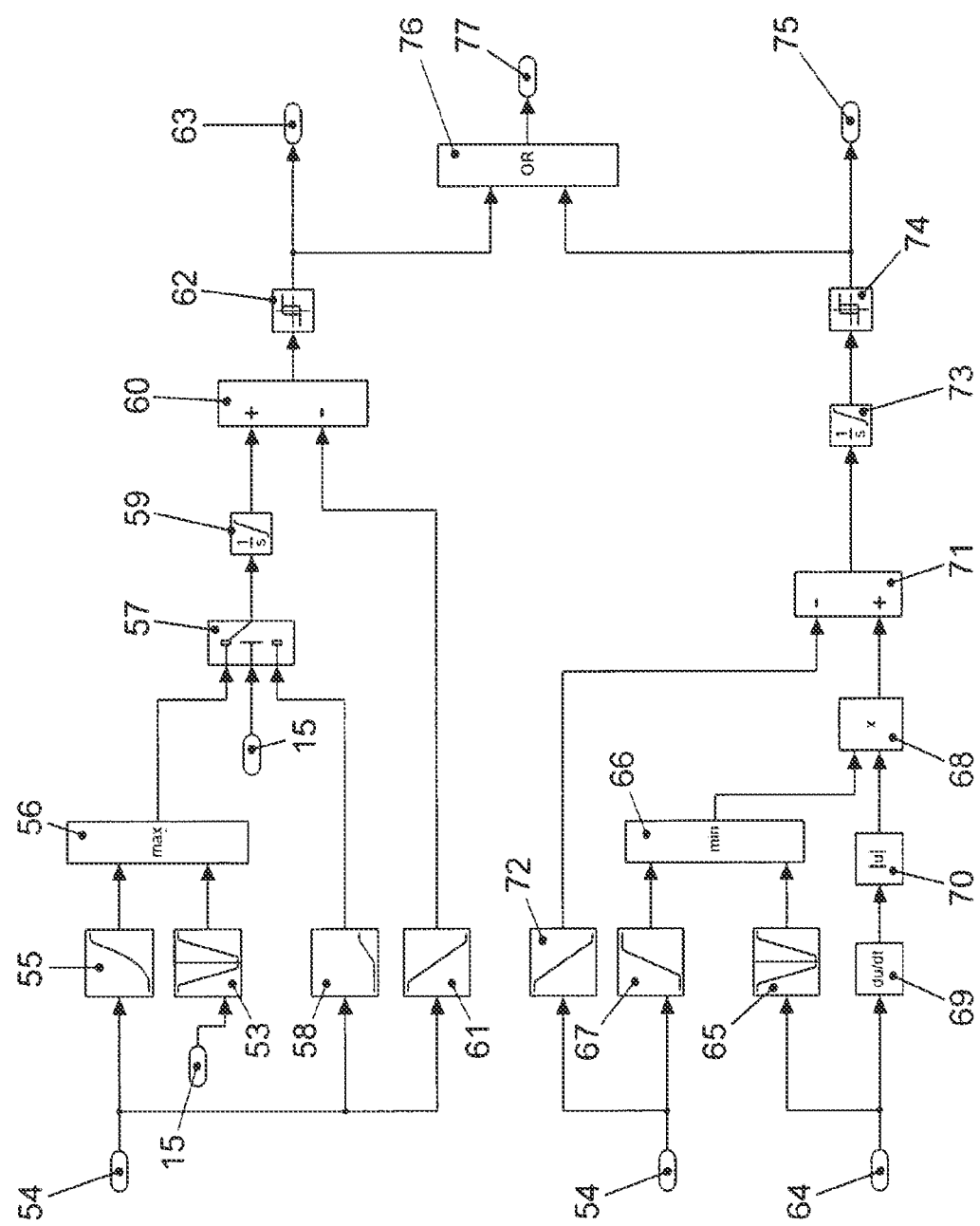
FIG. 23 shows a flow chart for producing a switchover operation between the second and the third total light patterns according to method of an example embodiment of the present invention.

Switch 57 subsequently switches to the second input—shown at the bottom in FIG. 23—which is connected to a speed-dependent step size decrementer 58. Using speedometer 54, the current vehicle speed is forwarded to step size decrementer 58 as well. Step size decrementer 58 uses a characteristic curve to determine a step size value by which the step size of integrator 59 is to be decremented per time unit. In other words, step size decrementer 58 specifies a speed-dependent decrease rate for the step size.

The step size determined by integrator 59 may be restricted to a range of 30 to 300, for instance. The decrease rate specified by step size decrementer 58 may lie in a range of −40 to 30 per second in this case.

In addition, speed-dependent shifting of the step size value takes place in order to directly influence the activation and deactivation thresholds for third total light pattern 41 via the vehicle speed. To do so, speedometer 54 furthermore forwards the current speed to shift unit 61, which uses a characteristic curve to define a shift for the step size. The step size output by integrator 59 is forwarded to a positive input of a computing element 60, which transmits the step size output by shift unit 61 to a negative input of computing element 60. Computing element 60 subtracts the step size transmitted by shift unit 61 from the step size output by integrator 59 and outputs the result to a hysteresis unit 62, Hysteresis unit 62 specifies the switchover thresholds, so that excessive switching between the two total light pattern is prevented.

Finally, a characteristics signal either for second or third total light pattern 40, 41 is output via first output unit 63, as a function of the step size output by computing element 60. Control unit 16 is able to control the headlamp system as a function of this characteristics signal. However, it is also possible that it additionally considers steering angle changes of vehicle 10, as will be described in the following text.

In such a case, the steering angle of the vehicle is continuously detected with the aid of a steering angle detection unit 64. The detected steering angle is forwarded to a generating unit 65 for generating a weighting factor. Generating unit 65 outputs a weighting factor, determined as a function of the steering angle, to the first input of a logic unit 66.

In addition, the speed determined by speedometer 54 is transmitted to a second generating unit 67 for generating an additional weighting factor. Using a characteristic curve, this unit 67 generates a weighting factor, which is transmitted to the second input of logic unit 66. Logic unit 66 determines which one of the two transmitted weighting factors is the smaller one and forwards it to the first input of a weighting unit 68.

The steering angle determined by steering angle detection unit 64 is forwarded to a differentiator 69, which determines the temporal steering angle change. The absolute value of the angular change is determined in computing element 70 and forwarded to the second input of weighting unit 68. Thus, weighting unit 68 determines a characteristic quantity as a function of characteristic curves for the vehicle speed and as a function of the steering angle or the steering angle change, the characteristic quantity being forwarded to a positive input of another computing element 71. Speedometer 54 also forwards the current vehicle speed to a threshold value generator 72, which generates a speed-dependent threshold value with the aid of a characteristic curve, and forwards it to a negative input of computing element 71. In computing element 71, the threshold value is subtracted from the characteristic quantity and the result is transmitted to an integrator 73. The threshold value generated by threshold value generator 72 is selected such that no input value for weighting unit 71 that induces a reduction of the characteristic quantity determined by integrator 73 results when no or only a slight steering angle change occurs. The threshold for reducing the characteristic quantity for the steering angle change determined by integrator 73 lies in a range between 2° per second to 3° per second.

The characteristic quantity integrated by integrator 73 reflects a change in the steering angle. Integrator 73 transmits the determined steering angle change to a hysteresis unit 74, which realizes activation and deactivation thresholds for the switchover operation in an effort to prevent excessive back-and-forth switching. Hysteresis unit 74, for example, is adjusted such that a switchover from second total light pattern 40 to third total light pattern 41 takes place above integrated steering angle changes of approximately 200 degrees. If the integrated steering angle change is below approximately 100 degrees, then the second total light pattern becomes active again. Hysteresis unit 74 outputs an identifying signal via second output unit 75, which characterizes either second or third total light pattern 40, 41.

With the aid of first output unit 63 or with the aid of second output unit 75, control unit 16 is able to determine which total light pattern is to be triggered. In addition, a further logic unit 76 may be provided in control unit 16, to which the identifying signals of first output unit 63 and second output unit 75 are transmitted. Using these two input signals, logic unit 76 determines an identifying signal, which is output via third output unit 77. In this case, an identifying signal for third total light pattern 41 is generated when such an identifying signal is output by first output unit 63 or second output unit 75. Control unit 16 may then use this identifying signal to generate the corresponding total light pattern by the headlamp system.

LIST OF REFERENCE CHARACTERS

1 right headlamp
2 left headlamp
3 light source
4 housing
5 light disk
6 reflector
7 projection lens
8 first diaphragm
8a shading edge of first diaphragm 9 second diaphragm
9a shading edge of second diaphragm
10 vehicle having the headlamp system
11 oncoming vehicle
12 preceding vehicle
13 control unit for the right headlamp
14 control unit for the left headlamp
15 image-processing unit (device for detecting other road users)
16 control device
17 vehicle bus
18 camera
19 first actuator for the right headlamp
20 second actuator for the right headlamp
21 third actuator for the right headlamp
22 first actuator for the left headlamp
23 second actuator for the left headlamp
24 third actuator for the left headlamp
25 device for detecting the driving behavior
26 delay unit
27 timer
28 navigation device
29 GPS receiver
30 center axis
31 extraction unit
32 classifier
33 confidence unit
34 assignment unit
35 horizontal plane
36 center axis
37 horizontal axis
38 vertical axis
39 first total light pattern/permanent low beam
40 second total light pattern/masked high beam
41 third total light pattern/sliding illumination range
42 15° increase in the first total light pattern
43 illumination range
44 illumination range
45 signal transmitter
46 switch
47 time incrementer
48 switch
49 signal transmitter
50 first timer for decrease rate
51 second timer for decrease rate
52 integrator
53 position-dependent first step size incrementer
54 speedometer
55 position-dependent second step size incrementer
56 logic unit
57 switch
58 position-dependent step size incrementer
59 integrator
60 computing element
61 shift unit
62 hysteresis unit
63 first output unit
64 steering angle detection unit
65 first weighting factor generating unit
66 logic unit
67 second weighting factor generating unit
68 weighting unit
69 differentiator
70 computing element
73 threshold value generator
100/-170 method steps
180/-280 method steps

What is claimed is:

1. A method for controlling a headlamp system for a vehicle, the headlamp system having two headlamps set apart from each other, comprising:
   detecting road users in front of the vehicle in a driving direction;
   producing a first total light pattern having an illumination range on a first side of a center axis is greater than on a second side of this center axis, and a second total light pattern having an illumination range in a direction of at least one detected road user that is less than a distance to the detected road user and an illumination range in another direction that is greater than the distance to the detected road user; and
   during a switch from the first total light pattern to the second total light pattern, reducing the illumination range of at least one headlamp on the first side of the center axis to at least such an extent that it is less than the distance to the detected road user, the second total light pattern being produced subsequently;
   wherein the road user is detected in front of the vehicle by:
   recording an image of a traffic environment in a visible spectral range;
   extracting cohesive areas having a brightness that exceeds a threshold value from the image;
   classifying the areas at least as a function of size;
   forming a confidence value that represents a measure of a similarity between the area of the image and a vehicle light, from the classification of the area and a physical quantity assigned to the area; and
   determining whether an area will be assigned to a vehicle light as a function of the confidence value.

2. The method according to claim 1, wherein the total light patterns are produced by superpositioning a first partial light pattern of the first headlamp and a second partial light pattern of the second headlamp, the illumination range of at least the second headlamp on the first side of the center axis being reduced in the switch from the first total light pattern to the second total light pattern, and a light emission direction of the second headlamp being tilted about a perpendicular pivot angle to produce the second total light pattern.

3. The method according to claim 1, wherein the first total light pattern includes a low beam functionality.

4. The method according to claim 1, wherein in the second total light pattern, the illumination range in the direction of the detected road user is controlled to extend to the detected road user.

5. The method according to claim 1, wherein in the second total light pattern, a center region having a lower illumination range is formed in the direction of the detected road user, and side regions, which have a greater illumination range, are formed on both sides adjacent to the center region.

6. The method according to claim 5, wherein in the second total light pattern, the side regions each form a vertical light-dark cutoff to the center region.

7. The method according to claim 1, wherein the switch from one total light pattern to the other total light pattern is performed automatically as a function of the detection of the road user.

8. A headlamp system for a vehicle, comprising:
   at least two headlamps set apart from each other and adapted to generate a total light pattern;
   a road user detection device adapted to detect road users in front of the vehicle in a driving direction; and
   a control unit, coupled to the road user detection device and adapted to produce a first total light pattern having an illumination range on a first side of a center axis that is greater than on a second side of the center axis and a second total light pattern having an illumination range in a direction of at least one detected road user that is less than a distance to the detected road user and having an illumination range in another direction that is greater than the distance to the detected road user;

wherein the control unit is adapted to control the headlamps, during a switch from the first total light pattern to the second total light pattern, to reduce the illumination range of at least one headlamp on the first side of the center axis to at least such an extent that it is less than the distance to the detected road user and to subsequently produce the second total light pattern;

wherein the road user is detected in front of the vehicle by:

recording an image of a traffic environment in a visible spectral range;

extracting cohesive areas having a brightness that exceeds a threshold value from the image;

classifying the areas at least as a function of size;

forming a confidence value that represents a measure of a similarity between the area of the image and a vehicle light, from the classification of the area and a physical quantity assigned to the area; and determining whether an area will be assigned to a vehicle light as a function of the confidence value.

\* \* \* \* \*